United States Patent
Kawai et al.

(10) Patent No.: US 7,464,326 B2
(45) Date of Patent: Dec. 9, 2008

(54) APPARATUS, METHOD, AND COMPUTER PROGRAM PRODUCT FOR CHECKING HYPERTEXT

(75) Inventors: Hideki Kawai, Tokyo (JP); Toshikazu Fukushima, Tokyo (JP)

(73) Assignee: NEC Corporation, Tokyo (JP)

( * ) Notice: Subject to any disclaimer, the term of this patent is extended or adjusted under 35 U.S.C. 154(b) by 403 days.

(21) Appl. No.: 10/685,456

(22) Filed: Oct. 16, 2003

(65) Prior Publication Data

US 2004/0083424 A1 Apr. 29, 2004

(30) Foreign Application Priority Data

Oct. 17, 2002 (JP) ............... 2002-302585

(51) Int. Cl.
*G06F 17/00* (2006.01)
(52) U.S. Cl. ..................... 715/205; 715/234
(58) Field of Classification Search ................ 715/513, 715/501.1, 205, 234, 237
See application file for complete search history.

(56) References Cited

U.S. PATENT DOCUMENTS

| | | | | |
|---|---|---|---|---|
| 6,253,204 B1 * | 6/2001 | Glass et al. | ................. | 707/102 |
| 6,321,242 B1 * | 11/2001 | Fogg et al. | ................. | 715/513 |
| 6,578,078 B1 * | 6/2003 | Smith et al. | ................. | 709/224 |
| 6,601,066 B1 * | 7/2003 | Davis-Hall | ................. | 707/5 |
| 6,606,653 B1 * | 8/2003 | Ackermann et al. | ......... | 709/219 |
| 6,826,624 B1 * | 11/2004 | Fell, Jr. | ................. | 709/245 |
| 6,952,723 B1 * | 10/2005 | Laiho | ................. | 709/217 |
| 7,028,032 B1 * | 4/2006 | Diedrich et al. | ............... | 707/10 |
| 7,058,633 B1 * | 6/2006 | Gnagy et al. | ................. | 707/10 |
| 2002/0065720 A1 * | 5/2002 | Carswell et al. | ................ | 705/14 |
| 2002/0133514 A1 * | 9/2002 | Bates et al. | ............... | 707/501.1 |
| 2003/0004978 A1 * | 1/2003 | Greenbaum | ................. | 707/202 |
| 2003/0084095 A1 * | 5/2003 | Hayden | ................. | 709/203 |
| 2003/0158953 A1 * | 8/2003 | Lal | ................. | 709/230 |
| 2004/0059809 A1 * | 3/2004 | Benedikt et al. | ............ | 709/224 |
| 2004/0205569 A1 * | 10/2004 | McCarty et al. | ............. | 715/513 |

FOREIGN PATENT DOCUMENTS

| | | |
|---|---|---|
| JP | 9-259138 A | 10/1997 |
| JP | 2001-209570 A | 8/2001 |
| JP | 2001-273185 A | 10/2001 |

* cited by examiner

*Primary Examiner*—Laurie Ries
(74) *Attorney, Agent, or Firm*—Sughrue Mion, PLLC

(57) ABSTRACT

A hypertext checking apparatus comprises: a hypertext database 21 which stores the information about a page and a link; an information collecting unit 11 which collects an information about the page and the link in the hypertext obtained from the hypertext database 21; a condition detecting unit 13 which refers to the hypertext database 21 to detect a part including logically mismatched link; a candidate providing unit 12 that provides a correction candidate related to the parts detected by the condition detecting unit 13; and a correction reflecting unit 14 which corrects the hypertext based on the part detected by the condition detecting unit 13 and the correction candidate provided by the correction providing unit 12.

60 Claims, 26 Drawing Sheets

GROUP OF DOCUMENTS AS OF AUG. 15TH.

GROUP OF DOCUMENTS AS OF SEP. 15TH,

FIG. 6A

DOCUMENT 141

```
<HTML>
<HEAD><TITLE>CORRECTION OF RELEVANT LINKS</TITLE></HEAD>

<DIV align="center">
<H1>RELATED PRODUCT OF GX SERIES</H1>

<A href="DOCUMENT142" target="_blank" style="st01">GX0011</A><BR>
<A href="DOCUMENT143" target="_blank" style="st01">GX0012</A><BR>
<A href="DOCUMENT144" target="_blank" style="st01">GX0013</A><BR>
<A href="DOCUMENT145" style="st01">GX0014</A><BR>

</DIV>
</HTML>
```

FIG. 6B

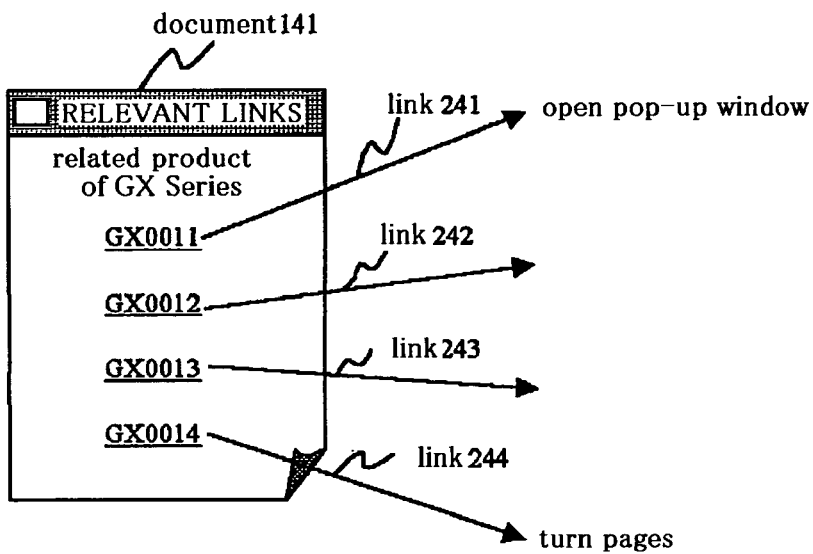

FIG. 7A

DOCUMENT151

```
<HTML>
<HEAD><TITLE> STOCK STATUS</TITLE></HEAD>

<DIV align="center">
<H1> STOCK STATUS OF GX SERIES </H1>

<A href="HIDDEN_URL"></A>

<TABLE border="1">
<TR><TH>PRODUCT ID</TH><TH>PRICE</TH><TH>STOCK</TH></TR>
<TR><TD>GX0011</TD><TD>¥4,000</TD><TD>○(IN STOCK)</TD></TR>
<TR><TD>GX0012</TD><TD>¥4,200</TD><TD>○(IN STOCK)</TD></TR>
<TR><TD>GX0013</TD><TD>¥4,200</TD><TD>△(HARD TO FIND)</TD></TR>
<TR><TD>GX0014</TD><TD>¥5,500</TD><TD> ×  (CONTACT US)</TD></TR>
</TABLE>

</DIV>
</HTML>
```

FIG. 7B

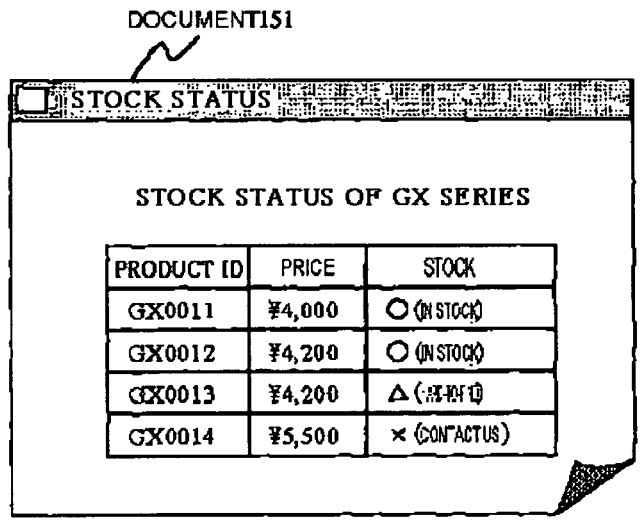

| LINK ID | LINK SOURCE ADDRESS | LINK TARGET ADDRESS | LINK SOURCE DESCRIPTION | TARGET ATTRIBUTE | STYLE ATTRIBUTE |
|---|---|---|---|---|---|
| LINK201 | DOCUMENT101 | DOCUMENT102 | GX0011 | _blank | st01 |
| LINK202 | DOCUMENT101 | DOCUMENT103 | GX0012 | _blank | st01 |
| LINK203 | DOCUMENT101 | DOCUMENT104 | GX0013 | _blank | st01 |

FIG. 13

| KIND OF MISMATCH | CORRECTION CANDIDATE | LINK ID | LINK SOURCE [SORT] | LINK TARGET [SORT] | LINK SOURCE DESCRIPTION [SORT] | target | style |
|---|---|---|---|---|---|---|---|
| ERROR LINK | LINK SOURCE DESCRIPTION: "WHAT'S NEW" | LINK 278 | DOCUMENT 177 | DOCUMENT 179 | EVENT INFORMATION | — | — |
| | | LINK 279 | DOCUMENT 178 | | | | |
| LINK FOR EXPIRED INFORMATION | LINK: DELETE | LINK 271 | DOCUMENT 171 | DOCUMENT 175 | O × CAMPAIGN NOW UNDERWAY | new | st02 |
| | | LINK 272 | DOCUMENT 172 | | | | |
| | | LINK 273 | DOCUMENT 173 | | | | |
| | | LINK 274 | DOCUMENT 174 | | | | |
| ERROR LINK | LINK TARGET: DOCUMENT 177 OR LINK SOURCE DESCRIPTION: "PRODUCT B" | LINK 275 | DOCUMENT 172 | DOCUMENT 176 | PRODUCT A | — | — |
| | | LINK 276 | DOCUMENT 173 | | | | |
| | | LINK 277 | DOCUMENT 174 | | | | |

MISMATCHED LINK DETECTING TOOL
RESULT OF EXTRACTION OF MISMATCH
ANALYSIS NAME: A.com  DOMAIN: www.a.com
SORT BY LINK SOURCE DOCUMENT
SORT BY LINK TARGET DOCUMENT
SORT BY LINK SOURCE DESCRIPTION REFLECT CORRECTION   RE-WRITABLE BY ADMINISTRATOR
ACCESS TO CORRESPONDING DOCUMENT

FIG. 15A

| UNSUITABILITY SCORE | LINK ID | LINK SOURCE ADDRESS | LINK TARGET ADDRESS | LINK SOURCE DESCRIPTION | TARGET ATTRIBUTE | STYLE ATTRIBUTE |
|---|---|---|---|---|---|---|
| 1/12 | LINK 211 | DOCUMENT 111 | | | — | — |
| 1/12 | LINK 212 | DOCUMENT 112 | DOCUMENT 116 | GX0011 | — | — |
| 1/12 | LINK 213 | DOCUMENT 113 | | | — | — |
| 3/4 | LINK 214 | DOCUMENT 114 | DOCUMENT 117 | | — | — |
| 1/2 | LINK 215 | DOCUMENT 115 | DOCUMENT 116 | GX0012 | — | — |
| 1/2 | LINK 216 | DOCUMENT 115 | DOCUMENT 117 | | — | — |

FIG. 15B

| UNSUITABILITY SCORE | LINK ID | LINK SOURCE ADDRESS | LINK TARGET ADDRESS | LINK SOURCE DESCRIPTION | TARGET ATTRIBUTE | STYLE ATTRIBUTE |
|---|---|---|---|---|---|---|
| 1/12 | LINK 211 | DOCUMENT 111 | | | — | — |
| 1/12 | LINK 212 | DOCUMENT 112 | DOCUMENT 116 | GX0011 | — | — |
| 1/12 | LINK 213 | DOCUMENT 113 | | | — | — |
| 3/4 | LINK 215 | DOCUMENT 115 | | GX0012 | — | — |
| 1/2 | LINK 214 | DOCUMENT 114 | DOCUMENT 117 | GX0011 | — | — |
| 1/2 | LINK 216 | DOCUMENT 115 | | GX0012 | — | — |

FIG. 15C

| UNSUITABILITY SCORE | LINK ID | LINK SOURCE ADDRESS | LINK TARGET ADDRESS | LINK SOURCE DESCRIPTION | TARGET ATTRIBUTE | STYLE ATTRIBUTE |
|---|---|---|---|---|---|---|
| 1/2 | LINK 215 | DOCUMENT 115 | DOCUMENT 116 | GX0012 | — | — |
| 1/2 | LINK 216 | | DOCUMENT 117 | | — | — |

FIG. 15D

| UNSUITABILITY SCORE | LINK ID | LINK SOURCE ADDRESS | LINK TARGET ADDRESS | LINK SOURCE DESCRIPTION | TARGET ATTRIBUTE | STYLE ATTRIBUTE |
|---|---|---|---|---|---|---|
| 1 | LINK 214 | DOCUMENT 114 | DOCUMENT 117 | GX0011 | — | — |
| 1 | LINK 215 | DOCUMENT 115 | DOCUMENT 116 | GX0012 | — | — |

| SCORE | LINK ID | LINK SOURCE ADDRESS | LINK TARGET ADDRESS | LINK SOURCE DESCRIPTION | TARGET ATTRIBUTE | STYLE ATTRIBUTE |
|---|---|---|---|---|---|---|
| 1/12 | LINK 231 | DOCUMENT131 | DOCUMENT135 | GX Series | — | — |
| 1/12 | LINK 232 | DOCUMENT132 | | GX Series | — | — |
| 1/12 | LINK 233 | DOCUMENT133 | | | ATTRIBUTE | — |
| 3/4 | LINK 234 | DOCUMENT134 | | gX Series | — | — |

| DATE AND TIME | LINK ID | LINK SOURCE ADDRESS | LINK TARGET ADDRESS | LINK SOURCE DESCRIPTION | TARGET ATTRIBUTE | STYLE ATTRIBUTE |
|---|---|---|---|---|---|---|
| AUG. 15TH, 2002 | LINK 221 | DOCUMENT121 | DOCUMENT125 | FREE ADMISSION FEE | — | — |
|  | LINK 222 | DOCUMENT122 |  | FREE ADMISSION FEE | — | — |
|  | LINK 223 | DOCUMENT123 |  | FREE ADMISSION FEE | — | — |
|  | LINK 224 | DOCUMENT124 |  | FREE ADMISSION FEE | — | — |
| SPT. 15TH, 2002 | LINK 224 | DOCUMENT124 |  | FREE ADMISSION FEE | — | — |

FIG. 27

| IMPORTANCE | KIND OF MISMATCH | | LINK ID | LINK SOURCE [SORT] | LINK TARGET [SORT] | LINK SOURCE DESCRIPTION [SORT] | target | style |
|---|---|---|---|---|---|---|---|---|
| 93 | LINK FOR EXPIRED INFORMATION | LINK : DELETE | LINK 271 | DOCUMENT 171 | DOCUMENT 175 | O × CAMPAIGN NOW UNDERWAY | new | st02 |
| | | | LINK 272 | DOCUMENT 172 | | | | |
| | | | LINK 273 | DOCUMENT 173 | | | | |
| | | | LINK 274 | DOCUMENT 174 | | | | |
| 88 | ERROR LINK | LINK TARGET: DOCUMENT 177 OR LINK SOURCE DESCRIPTION: "PRODUCT B" | LINK 275 | DOCUMENT 172 | DOCUMENT 176 | PRODUCT A | — | — |
| | | | LINK 276 | DOCUMENT 173 | | | | |
| | | | LINK 277 | DOCUMENT 174 | | | | |
| 70 | ERROR LINK | LINK SOURCE DESCRIPTION: "WHAT'S NEW" | LINK 278 | DOCUMENT 177 | DOCUMENT 179 | EVENT INFORMATION | — | — |
| | | | LINK 279 | DOCUMENT 178 | | | | |

MISMATCHED LINK DETECTING TOOL
RESULT OF EXTRACTION OF MISMATCH
SORT BY LINK SOURCE DOCUMENT
SORT BY LINK TARGET DOCUMENT
SORT BY LINK SOURCE DESCRIPTION
ANALYSIS NAME : A.com  DOMAIN: www.a.com REFLECT CORRECTION  RE-WRITABLE BY ADMINISTRATOR
ACCESS TO CORRESPONDING DOCUMENT
ACCESS TO CORRESPONDING DOCUMENT

APPARATUS, METHOD, AND COMPUTER PROGRAM PRODUCT FOR CHECKING HYPERTEXT

This application is based on Japanese patent application No. 2002-302585, the content of which is incorporated hereinto by reference.

BACKGROUND OF THE INVENTION

1. Field of the Invention

The present invention relates to an apparatus, method and computer program product for checking web page links, and more particularly, to an apparatus, method and computer program product for detecting errors in hyperlinks and relationships between links and target web pages.

2. Description of the Related Art

In recent years, companies, organizations, and people have had many occasions to make the computerized information public on the Internet. Most of information published on these sites are hypertexts.

There is disclosed a first example of the conventional technology of hypertext link checking in nonpatent literature describing "LinkScan™" produced by Elsop™ (Electronic Software Publishing Corporation), available on the Elsop website, last searched on Oct. 9, 2002. This is a tool that automatically scans hypertext links and compiles logs of detected link errors. The disclosed link checker includes one type of the link checker adapted to diagnose a target online in accordance with the specified address of the target, and another type of link checker adapted to perform offline diagnosis of a website downloaded to a folder on a hard disk.

There is disclosed a second example of the conventional technology of detecting a physical mismatch in a link, in Japanese Non-examined Patent Publication No. 2001-273185. The method in the conventional technology comprises the steps of: storing an address of the link to be managed in a database; and checking whether there is a document at the stored address of the link or not, thereby making it possible to detect a physical mismatch in such as a dead link. The above conventional method further comprises the step of previously registering, on a system, a keyword and image for identifying each of documents in the database. In the conventional method, when the dead link is detected, it is possible to search for a vanished page by a search engine to then provide with a correction candidate.

There is a third example of the conventional technology of a typical system for checking a document including a document correcting system such as an auto-correcting function in Microsoft® Word produced by Microsoft Corporation. These document correcting systems are operable to detect an inappropriate expression and to then output a correction candidate.

A first problem to be solved is that, in the aforementioned first and second example of the conventional technologies, only a physical mismatched link can be detected, but a logically mismatched link can not be detected, because of the fact that, in the aforementioned conventional technologies, the judgment whether there is a mismatch or not is made based on only the result of the judgment whether an error is returned from a server or not, when the connection to an address of a link is gotten. The method of detecting a logically mismatch has no choice but to rely on manual and visual confirmation on a browser at present, because no error occurs in case of the logically mismatch.

A second problem to be solved is that, in the aforementioned first and second example of the conventional technologies, it is impossible to provide a correction candidate for the logically mismatch but it is possible to provide a correction candidate for only the physical mismatch. The reason for this problem is the similar to that of the above first problem.

A third problem to be solved is that the manual and visual confirmation on the browser needs enormous cost. The reason for this problem is that a large scale of site, such as of a company, has links of between thousand and tens of thousands, and the number of links between documents reaches to between tens of thousands and hundreds of thousand. The confirmation of whole of these links is not realistic about viewpoints of time and cost. The confirmation on the browser is also apt to omit to check a phantom link and the like.

A fourth problem to be solved is that, in the aforementioned third conventional technology, the logically mismatch, such as disunity in the hyperlink, cannot be detected causing confusion by the fact that the hyperlinks have different expressions for the links to the same documents. The reason of this problem is that a hyperlink having any appropriate syntax may be regarded as normal.

SUMMARY OF THE INVENTION

It is therefore a first object of the present invention to provide an apparatus, method, and computer program product for checking a link in which not only the physical mismatch but also logical mismatch can be detected.

It is a second object of the present invention to provide an apparatus, method, and computer program product for checking a link in which it is possible to provide an administrator with a correction candidate of not only the physical mismatch but also the logical mismatch.

It is a third object of the present invention to provide an apparatus, method, and computer program product for checking a link in which a cost of the mismatch check can be considerably reduced.

In accordance with an aspect of the present invention, there is provided an apparatus for checking a link, targeting a hypertext database, which detects at least one part of logically mismatched link including: a link having a mismatch between a hyperlink appearing on the source web page and contents on the target web page; a link having a mismatch between a hyperlink and contents on the target web page that is caused by correcting contents in the target web page; a link causing inconsistency among a plurality of different hyperlinks having the same target web page; a link causing inconsistency in styles among a plurality of different hyperlinks within the same page and around the pages; a link having no hyperlink; and a link in which all of the hyperlinks in a group of links forming a loop and corresponding to this group of links are related to a same topic.

More specifically, a first link checking apparatus comprises: an information storing unit which stores therein information about a page and link in the hyperlink; and a condition detecting unit for analyzing said information in said information storing unit to detect logically mismatched link.

A second link checking apparatus comprises: an information collecting unit for collecting information about a page and link in the hyperlink; an information storing unit capable of storing therein said information about the page and link; and a condition detecting unit for analyzing said information in said information storing unit to detect logically mismatched link.

A third link checking apparatus comprises: the constitutional elements of the first and second link checking apparatus; and a candidate providing unit for calculating a correction candidate concerning said links detected by said condition detecting unit.

A fourth link checking apparatus comprises: the constitutional elements of the third link checking apparatus; and an importance calculating unit for calculating and outputting importance value of the link detected by said condition detecting unit.

A fifth link checking apparatus comprises: the constitutional elements of the third and fourth link checking apparatus; and a correction reflecting unit for reflecting said hyperlink based on the part of the mismatched link detected by said condition detecting unit and the correction candidate calculated by said correction providing unit.

A sixth link checking apparatus comprises: the constitutional elements of the fourth link checking apparatus; and a total score calculating unit for calculating and outputting a total score concerning to said hyperlink in accordance with at least a factor or a combination of a plurality of factors including the importance value calculated by said importance calculating unit, the number of said links detected by said condition detecting unit, and the rate of the number of said links corresponding to the number of total links and detected by said condition detecting unit.

A seventh link checking apparatus comprises: the constitutional elements of the first and second link checking apparatus; and an importance calculating unit for outputting importance value of the links detected by said condition detecting unit.

An eighth link checking apparatus comprises: the constitutional elements of the seventh link checking apparatus; and a total score calculating unit for calculating and outputting a total score concerning to said hypertext in accordance with at least a factor or a combination of a plurality of factors including; the importance value calculated by said importance calculating unit, the number of said links detected by said condition detecting unit, and the rate of the number of said links corresponding to the number of total links and detected by said condition detecting unit.

In the first, second, seventh, and eighth link checking apparatus, said condition detecting unit may be operated to group the information about said links by a predetermined conditions, and to detect the information about the links excluded from said groups.

In the first, second, seventh, and eighth link checking apparatus, said condition detecting unit may be operated to detect a link having a mismatch between a hyperlink appearing on the source web page hyperlink and contents on the target web page. In this case, said condition detecting unit may be operated to calculate an criteria score of the link based on at least one of the criteria scores of the links including: (1) a first criteria score calculated by comparing the hyperlinks of the links for the same target web page; (2) a second criteria score calculated by comparing the target web pages of a plurality of links represented by the same hyperlink; (3) a third criteria score calculated by comparing the target web pages based on a plurality of links for the same target web page and the same hyperlink; and (4) a fourth criteria score calculated by comparing the hyperlink and the target web page in the contents, and said condition detecting unit is operated to detect a link with a high criteria score.

In the first, second, seventh, and eighth link checking apparatus, said condition detecting unit may be operated to detect a link having a mismatch between a hyperlink and contents on the target web page that is caused by correcting contents in the target web page.

In this case, said condition detecting unit may be operated to calculate an criteria score of the link based on at least one of the criteria scores of the links including: (1) a first criteria score calculated by comparing the hyperlinks of the links for the same target web page; (2) a second criteria score calculated by detecting at least a notice description including a movement notice description and an expiration notice description in the contents of the target web page; and (3) a third criteria score calculated by comparing the description of period of validity described in the contents of the target web page and the present date and time, and said condition detecting unit is operated to detect a link with a high criteria score.

In the first, second, seventh, and eighth link checking apparatus, said condition detecting unit may be operated to detect a link causing inconsistency among a plurality of different hyperlinks having the same target web page.

In the first, second, seventh, and eighth link checking apparatus, said condition detecting unit may be operated to detect part causing inconsistency in styles among a plurality of different hyperlinks within a same web page and in a same website.

In the third through sixth link checking apparatus, said condition detecting unit may be operated to group the information about said links by a predetermined conditions, and to detect the information about particular links excluded from said groups, while said candidate providing unit may be operated to obtain the correction candidate so as to uniform the information about said particular links with the other right links.

In the third through sixth link checking apparatus, said condition detecting unit may be operated to detect a link having a mismatch between a hyperlink and contents on the target web page.

In this case, said condition detecting unit may be operated to calculate an criteria score of the link based on at least one of the following scores of the links including: (1) a first score calculated by comparing the hyperlinks of the links for the same target web page; (2) a second score calculated by comparing the target web pages of a plurality of links represented by the same hyperlink; (3) a third score calculated by comparing the target web pages based on a plurality of links for the same target web page and the same hyperlink; and (4) a fourth score calculated by comparing the hyperlink and the target web page in the contents, and said condition detecting unit being operated to detect link with a high criteria score, said candidate providing unit being specifying at least a sort of correction candidate including: (1) a correction candidate of the hyperlink calculated by comparing the hyperlinks of the links for the same target web page; (2) a correction candidate of the hyperlink calculated by comparing the link target pages based on a plurality of links for the same hyperlink; (3) a correction candidate of the hyperlink calculated by comparing the link target pages based on a plurality of links for the same target web page and the same hyperlink; and (4) a correction candidate of the hyperlink calculated by comparing the hyperlink and the target web page in the contents.

In the third through sixth link checking apparatus, said condition detecting unit may be operated to detect part having a mismatch between a hyperlink and contents on the target web page that is caused by correcting contents in the target web page.

In this case, said condition detecting unit may be operated to calculate an criteria score of the link based on at least one of the criteria scores of the links including: (1) a first criteria score calculated by comparing the hyperlinks of the links for the same target web page; (2) a second criteria score calculated by detecting at least a notice description including a movement notice description and an expiration notice description in the contents of the target web page; and (3) a third criteria score calculated by comparing the description of period of validity described in the contents of the target web page and the present date and time, and said condition detecting unit is operated to detect a link with a high criteria score, said candidate providing unit being operated to specify at least a sort of correction candidate including: (1) a correction candidate of the hyperlink calculated by comparing the hyperlinks of the links for the same target web page; and (2) a correction candidate of the hyperlink calculated by extracting the information about a movement destination from with the contents of the target web page.

In the third through sixth link checking apparatus, said condition detecting unit may be operated to detect a link causing inconsistency among a plurality of different hyperlinks having the same target web page, said candidate providing unit being operated to calculate the correction candidate of the hyperlink by comparing the hyperlinks of the links for the same target web page.

In the third through sixth link checking apparatus, said condition detecting unit may be operated to detect a link causing inconsistency in styles among a plurality of different hyperlinks within the same page and within a same website, and said candidate providing unit being operated to calculate the correction candidate of the style of the hyperlink by comparing the style of a plurality of hyperlinks within the page and within a same website including the detected links.

In the second through sixth link checking apparatus, said information collecting unit may repeatedly collect the information about the page and link in the hyperlink, to further store said information about the page and link a plurality of times in said information storing unit. In this case, said condition detecting unit may be operated to analyze said information in said information storing unit to calculate a change, in accordance with time, in the number of targeted links corresponding to a page corrected in the contents, and a change in hyperlink with time, so as to detect links in which a mismatch between the hyperlink and the contents of the target web page.

In the first through eighth link checking apparatus, said condition detecting unit may be operated to detect a link having no hyperlink.

In the first through eighth link checking apparatus, said condition detecting unit may be operated to detect a link including a link having no character string and an image described as the hyperlink and a link having a character string and an image described as the hyperlink with an inconspicuous color and a size.

In the first through eighth link checking apparatus, said condition detecting unit may be operated to detect part in which all of the hyperlink in a group of links forming a loop and corresponding to this group of links are related to the same topic.

In the fourth through seventh link checking apparatus, said importance calculating unit may be operated to calculate importance value based on at least a factor or a combination of a plurality of factors including: (1) errors and unsuitability of the detected links; (2) accuracy of errors and unsuitability of the detected links; (3) the number of targeted links of the page including the detected links; (4) record for frequency of access by user to the page including the detected links; and (5) a stratification level in the hypertext of the page including the detected links, while said importance calculating unit may be operated to calculate the importance value of the detected links, and to control, in accordance with said level of importance value, output condition for the detected links including the number of outputting records, and a method of outputting the records.

In the second through eighth link checking apparatus, said information collecting unit may be operated to extract the character strings corresponding to said hyperlink by character recognition when the hyperlink is an image, and to register the extracted character strings as said information about page and link on said information storing unit.

The first through eighth link checking apparatus may target a hyperlink on a website.

In accordance with another aspect of the present invention, there is provided a first link checking method comprising the steps of: (a) determining conditions for the check of a hyperlink database so as to detect links including: links having an error in a hyperlink; links having an error in a relationship between links; links having unstability in a hyperlink; and links having unstability a relationship between links; and (b) displaying, on a display screen, a list having three items including: (1) a hyperlink; (2) identification information about a source web page; and (3) identification information about a target web page.

In the above hypertext checking method, said step (b) may include the step of displaying a list sorted by each of three items including: (1) a hyperlink; (2) identification information about a source web page; and (3) identification information about a target web page.

The above link checking method may further comprise the steps of: (b) displaying, on a display screen, a list having three items including: (1) a hyperlink; (2) identification information about a source web page; and (3) identification information about a target web page; (c) allowing an operator to correct said items (1), (2), and (3) on said display screen; and (d) reflecting all of said items corrected in said step (c) to correct said hyperlink database.

The above link checking method may further comprise the step of specifying the targeted hyperlink database.

A second link checking method comprising the steps of: (a) collecting information about a page and link in a website; (b) analyzing the result of said step (a) to detect a logically mismatched link; (c) calculating importance value of the link detected in said step (b) and calculating a total score concerning to a website; (d) performing periodically said steps (a) to (c) for a website specified as a target; and (e) informing about a change with time in said total score concerning to the specified website.

A third link checking method comprising the steps of: (a) collecting information about a page and link in a website; (b) analyzing the result of said step (a) to detect a logically mismatched link; (c) calculating importance value of the part detected in said step (b) and calculating a total score concerning to a website; (d) performing periodically said steps (a) to (c) for a website specified as a target; and (e) putting out an alert when said total score concerning to the specified website and said importance value of the detected link are fulfilled with a predetermined condition.

A fourth link checking method comprising the steps of: (a) collecting information about a page and link in a website; (b) analyzing the result of said step (a) to detect a logically mismatched link; (c) calculating importance value of the link detected in said step (b) and calculating a total score concerning to a website; (d) performing periodically said steps (a) to (c) for a plurality of websites each specified as a target; and (e) outputting a result of a ranking of said total scores of the specified plural websites in order in level.

In accordance with the first through eighth link checking apparatus, the processes including the steps of grouping the link information by particular conditions, and detecting a particular link excluded from the group as a mismatched link, are performed so as to have the condition detecting unit detect the logically mismatched link, thereby making it possible to achieve the first object of the present invention.

In accordance with the third though sixth link checking apparatus, the candidate providing unit is operated to perform the process of calculating the correction candidate to harmonize the link information of the particular link with the link information of large majority of the other appropriate links, thereby making it possible to achieve the second object of the present invention.

In accordance with the first though sixth link checking apparatus, the logically mismatch is automatically detected by the condition detecting unit. In accordance with the third though sixth link checking apparatus, the correction candidate is automatically calculated by the correction candidate providing unit. In fifth link checking apparatus, the logically mismatched parts are automatically corrected by the correction reflecting unit. Therefore, the third object of the present invention can be achieved.

BRIEF DESCRIPTION OF THE DRAWINGS

The present invention and many of the advantages thereof will be better understood from the following detailed description when considered in connection with the accompanying drawings, wherein:

FIG. 6A is a diagram showing one example of a logically mismatch due to inconsistency in styles of hyperlinks;

FIG. 6B is a diagram showing one example of a logically mismatch due to inconsistency in styles of hyperlinks;

FIG. 7A is a diagram showing one example of a logically mismatch due to a phantom link;

FIG. 7B is a diagram showing one example of a logically mismatch due to a phantom link;

FIG. 13 is a diagram of an example of a display screen of a list of results of the extracted mismatched link in the first embodiment of the hypertext checking apparatus according to the present invention;

FIGS. 15A to 15D are tables of examples of the link information extracted in respective steps in the process of extracting the error links shown in FIG. 14 in the first embodiment of the hypertext checking apparatus according to the present invention;

FIG. 27 is a diagram showing an example of a display screen of a list of results of the extracted mismatched link in the second preferred embodiment of the hypertext checking apparatus according to the present invention;

DESCRIPTION OF THE PREFERRED EMBODIMENTS

The hypertext means a set of documents structured with a hyperlink or a link and has a structure including links provided between the documents. Typical one example of the hypertext is a WWW (World Wide Web). The WWW is a collection of the hypertexts described in a HTML (Hyper Text Markup Language) format, such as a document shown in FIG. 2A. The links and anchor character strings are marked with <A> tag. The document 101 shown in FIG. 2A has href attributes of the <A> tags indicative of identification information of the documents 102, 103, and 104. The identification information of the document is generally referred to as "a URL" or "a web address" in the WWW, but will be only referred to as simply "an address" in the present invention. The character strings "GX0011", "GX0012", and "GX0013" interposed between the <A> tags are generally referred to as "anchor character strings". Because the image file is often interposed between the <A> tags, the image as well as the character string interposed between the <A> tags will be referred to as "a hyperlink" in the present invention and treated as the same.

Figure 2:
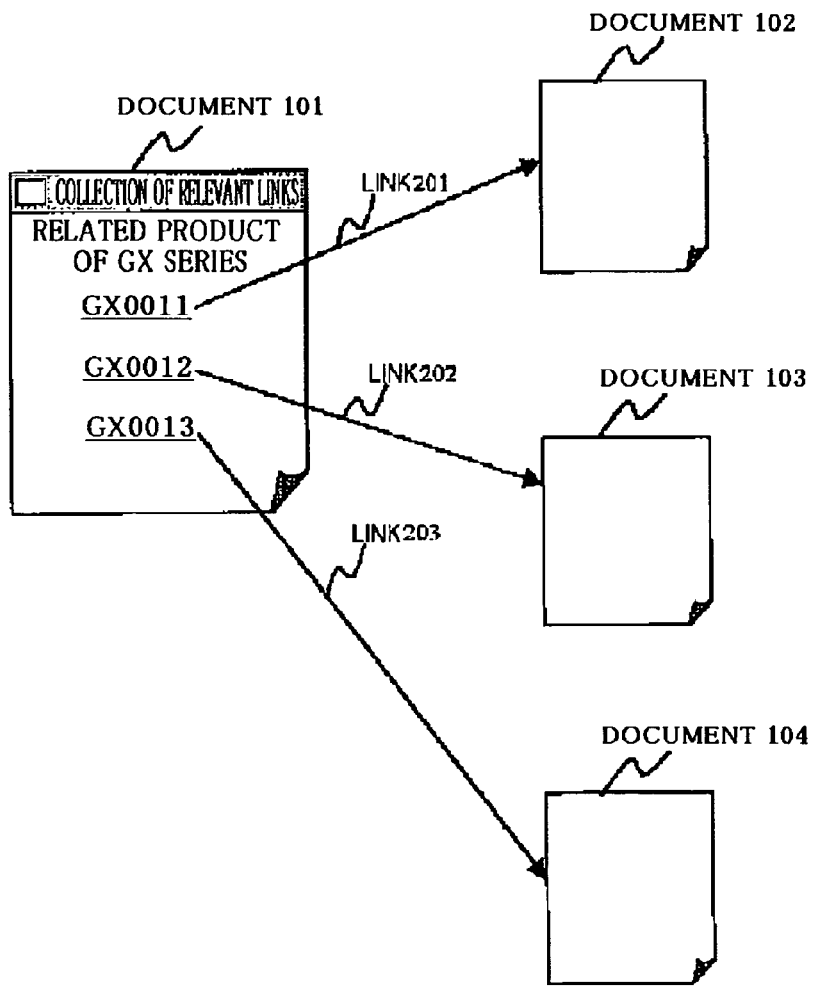
FIG. 2A is a diagram showing examples of a document described in the format of a hypertext on which some links are specified.
FIG. 2B is a diagram showing examples of a display screen of the document viewed through a browser.

The attribute of the <A> tag described in the document 101 shown in FIG. 2A has not only the href attribute but also a target attribute, a style attribute, or the like. The target attribute serves as an attribute for specifying which types of window is used to display thereon a document of a link target or a link destination. The style attribute serves as an attribute for specifying what size or which colors of a font, or highlighted representation are used to display the hyperlink. When the document 101 shown in FIG. 2A is viewed with a browser, the document 101 may be displayed on the display screen as shown in FIG. 2B. The document 101 has links 201, 202, and 203 for the documents 102, 103, and 104, respectively, and having hyperlinks "GX0011", "GX0012", and "GX0013", respectively. The document 102 may be accessed by way of the link 201 when the hyperlink "GX0011" in the document 101 is clicked. Similarly, the documents 103 and 104 may be accessed by way of the links 202 and 203, respectively, when the hyperlinks "GX0012" and "GX0013", respectively, in the document 101 are clicked.

Although the WWW has been explained above as typical examples of the hypertext, the present invention is not limited to the object to the WWW. The hypertext may be described with any languages including not only the HTML but also, for example, an XML (Extensible Markup Language), an SGML (Standard Generalized Markup Language), and so on.

In order to avoid any confusion in term "user", a person who visits a company, organization, or personal site to browse the hypertext is referred to as an "audience", while a person who utilizes the present invention to administer the hypertext is referred to as an "administrator", in the present invention.

The administration of the hypertext however becomes complex and difficult as amount of information published on the Internet increases. Therefore the rate of mismatched links, such as a link inappropriate for the hyperlink, or a link mistaken in the link target, increases. The mismatched link may be roughly classified into two types including a physical and logical mismatch.

The physical mismatch means a physically impossible mismatch to access the link target, in cases where there is no text of the link target, and where a server of the link target is down, for example. When the documents having these physical mismatches are accessed, the server or the client is operated to reply an error message.

In the event of the logical mismatch, it may be physically possible to access the link target, but there is a logical error made in the link of the pages such as wrong product information, or the expired campaign information. When a document including the logically mismatched part is accessed, the server is not operated to replay any error message, as a text in the link target exists as well as the server in the link target runs in good order. The audience is, however, sometimes confused by an error link, as well as the administrator sometimes suffers from responses to the applications for the expired campaign applied by the audience. The logical mismatches therefore have significant implications no less than that of the physical mismatch. There are some examples of the logical mismatch including, but are not limited to, (1) putting a link to a wrong destination, (2) putting a link to an expired information, (3) inconsistency in the hyperlink, (4) inconsistency in the styles of the hyperlinks, (5) a phantom link, and (6) a loop link, and so on. Examples of each logical mismatch are described in detail in the following with reference to the drawings.

(1) Putting a Link to a Wrong Destination

Figure 3:
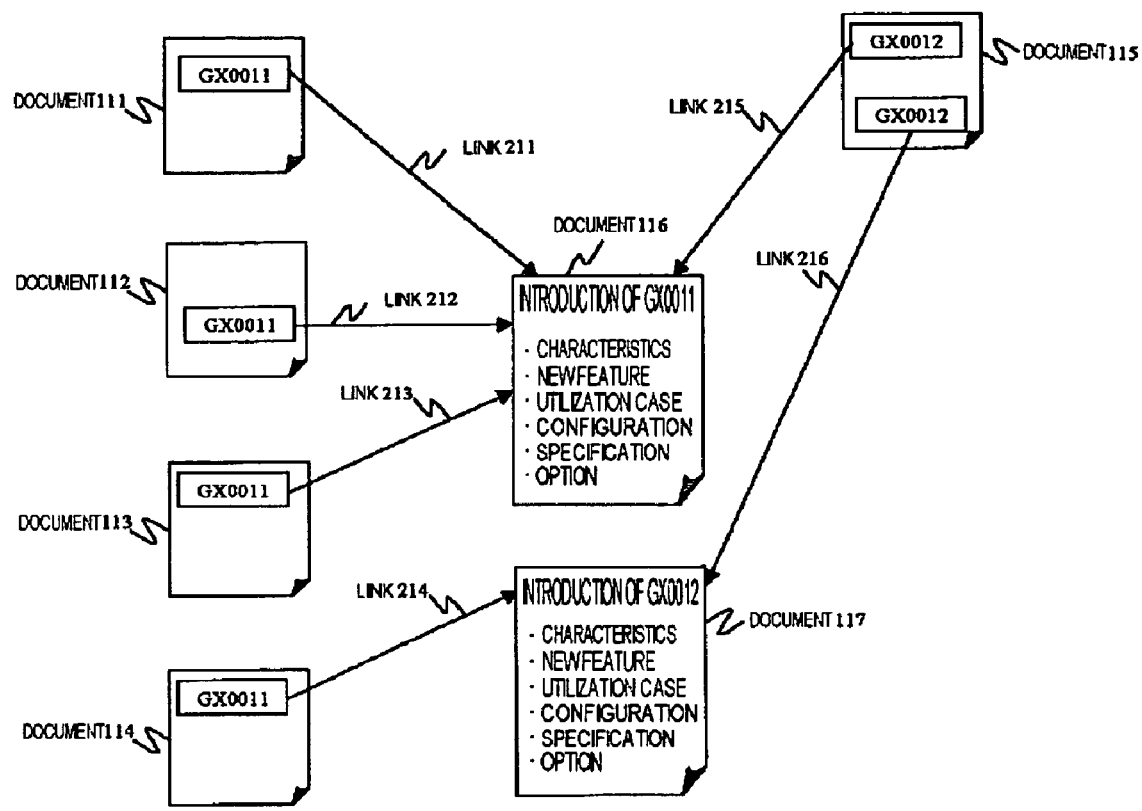
FIG. 3 is a diagram showing one example of a logically mismatch due to an error link.

As shown in FIG. 3, "putting a link to a wrong destination" means a mismatch caused between the contents expected from the hyperlink appearing on the source web page hyperlink and the practical contents in the text of the target web page. In FIG. 3, the hyperlinks of all of the links 211, 212, 213, and 214 are same in the description "GX0011". All of the link targets of the documents 111, 112, and 113 indicate the same document 116 which is representative of the product introduction of "GX0011", but the link target of the document 114 indicates the wrong document 117 which is representative of the product introduction of "GX0012". Therefore the audience can access the document 116 for the introduction information of "GX0011" as expected when browsing the documents 111, 112, and 113, but cannot access the document 116 as expected when browsing document 114. When browsing the document 114, the audience is linked to information different from that expected from the hyperlink "GX0011," thereby causing confusion to the audience.

Moreover, all of the destinations of the links 211, 212, 213 and 215 indicate the same document 116, but the hyperlink of link 215 incorrectly describes the destination as "GX0012". Therefore, when browsing document 115, another product introduction which is different from that expected from the hyperlink "GX0012" is displayed. This will again cause confusion to the audience.

Furthermore, the document 115 has two of links 215 and 216 to the documents 116 and 117, respectively. Both of the links 215 and 216, however, have the same hyperlink hyperlink "GX0012". Therefore, the audience who browses the document 115 finds the different contents of the documents 116 and 117 in spite of the fact that the audience selects the same hyperlink "GX0012".

In this embodiment, the example of putting the link to the wrong destination described above includes, but is not limited to, the error link to the product information and may further include a mistake of putting a link between an English document and a Japanese document, an error link for a link to a completely unrelated page, and so forth.

(2) Putting a Link to an Expired Information

Figure 4A:
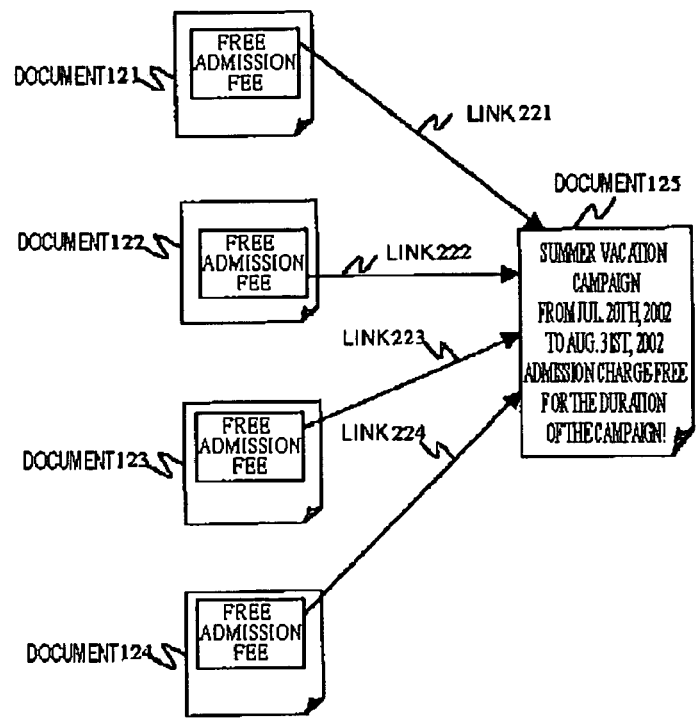
FIG. 4A is a diagram showing one example of a logically mismatch due to an expiration period link.
Figure 4B:
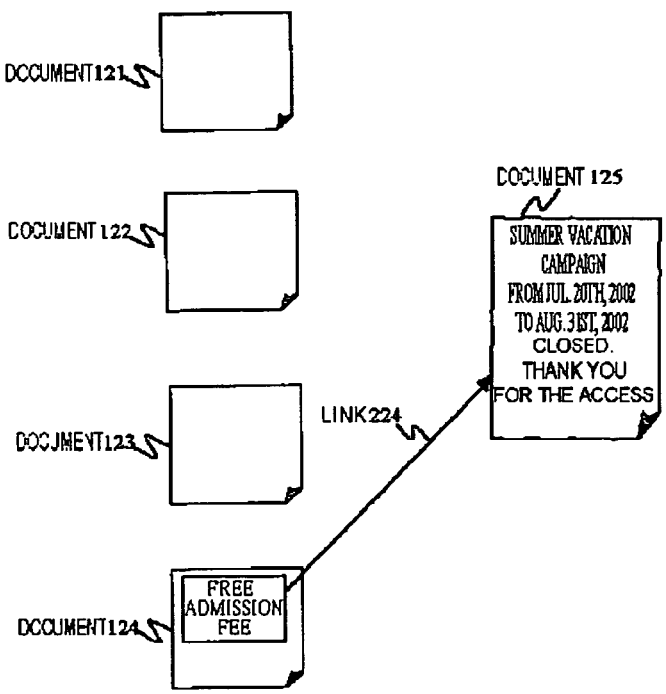
FIG. 4B is a diagram showing one example of a logically mismatch due to an expiration period link.

As shown in FIG. 4, "putting a link to an expired information" means a mismatch caused by a remaining expired campaign, or a remaining closed service. FIG. 4A shows a group of the documents as of Aug. 15, 2002, while FIG. 4B shows a group of the documents as of Sep. 15, 2002.

In FIG. 4A, it is announced, in the document 125, that a campaign is conducted for a limited time between Jul. 20, 2002 and Aug. 31, 2002. The documents 121, 122, 123 and 124 have the same hyperlink "free admission fee" for putting links 221, 222, 223 and 224, respectively, to the document 125 having contents of the campaign.

In FIG. 4B, it is announced, in the document 125, that the campaign is terminated because the date has expired. In the documents 121, 122 and 123, therefore, the link for the contents of the document 125 for the campaign is already eliminated. In the document 124, however, the link for the contents of the document 125 for the expired campaign is not eliminated yet, therefore the link 224 to the document 125 and the hyperlink "free admission fee" is still left. Thus, the audience who browses the document 124 cannot be provided with a service shown in the hyperlink "free admission fee" as expected.

In this embodiment, the example of putting a link to the expired information described above includes, but is not limited to, the link for the expired campaign, and may further include a link mismatch caused by transferring a first document from an original address to another address and replacing the first document with a second document at the original address. The link for the expired information in this embodiment may further include a mismatch caused by abandoning the service in the link target, or closing a site. The case when the document is eliminated due to the expiration, however, is included in the physical mismatch because an error occurs when accessing the document. The expired link may be considered as a type of the error link, but in the present invention, the link for the link source destination which is expired is especially distinguished from the error link and specified as the expired link.

(3) Inconsistency in Hyperlinks

Figure 5:
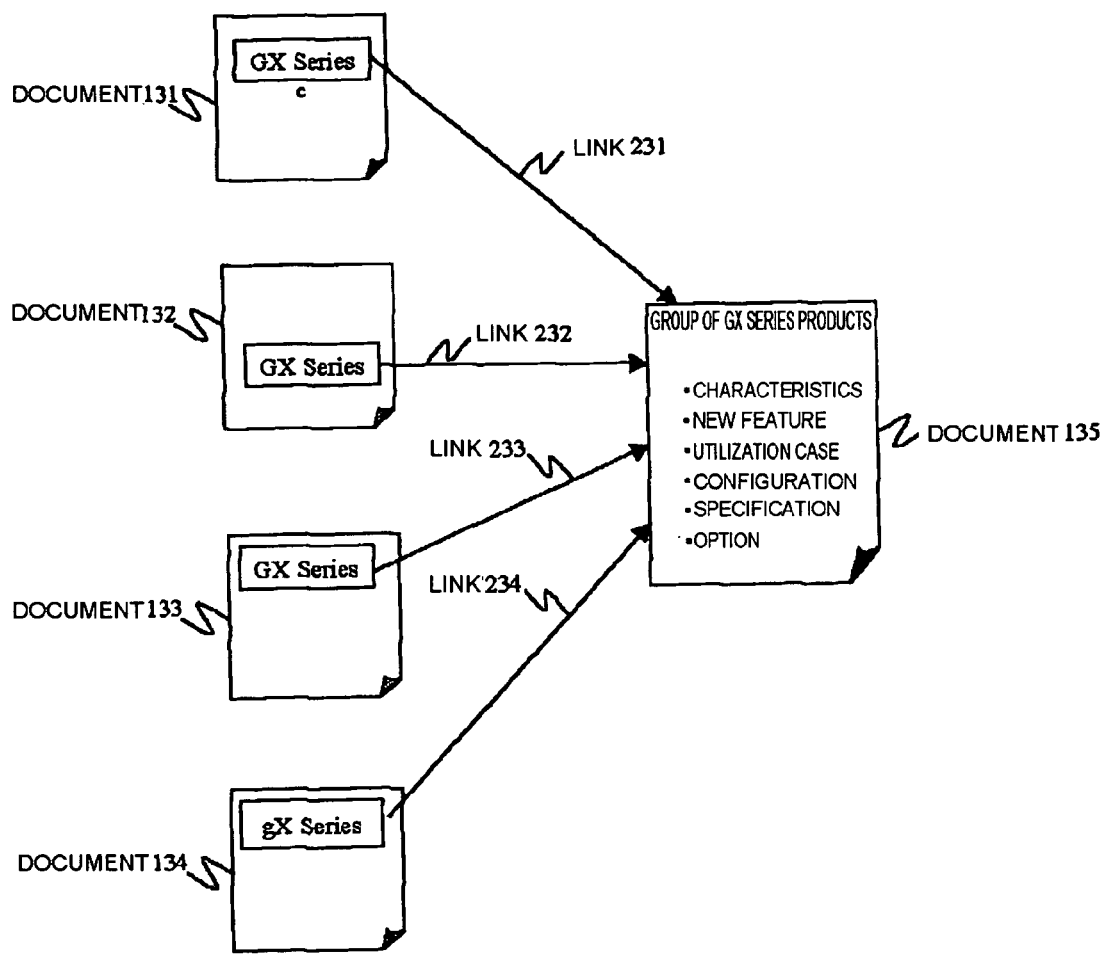
FIG. 5 is a diagram showing one example of a logically mismatch due to inconsistency in hyperlinks.

As shown in FIG. 5, the disunity in the hyperlinks means a mismatch when there is an error, for example, but not limited to, a typographical error, in the hyperlinks. In FIG. 5, the documents 131, 132, 133, and 134 put the links 231, 232, 233, and 234 to the document 135. All of the hyperlinks of the links 231, 232, and 233 indicate "GX Series", except for the hyperlink of the link 234 which indicates "gX Series". Therefore, the audience who browses the document 134 may believe that the hyperlink "gX Series" is different from "GX Series", and follow the link 234.

In this embodiment, the example of the disunity in the hyperlinks described above includes the difference between a capital and small letter in the hyperlink, but is not limited to, and may further include: a fluctuation between an English and Japanese characters; differences in "katakana" descriptions, such as "vaiorin" and "baiorin", both corresponding to "violin" in English; differences between a "katakana" and "hiragana", another kind of Japanese character; differences in vague or fuzzy similar expression, such as "event information" and "seminar information"; and spelling errors such as "Series" and "Selies".

(4) Inconsistency in the Style of the Hyperlink

As shown in FIG. 6, the disunity in the style of the hyperlink means a mismatch in different views of the link, or different effects when clicking on a link button, for example, due to different style or target attributes. In FIG. 6A, the document 141 has four links 241, 242, 243, and 244, three of which specify the target attribute as "_blank" so as to open a pop-up window to display the page of the link target thereon. Therefore, the audience browsing the document 141 as shown in FIG. 6B may browse the documents 142, 143, and 144 of the link targets corresponding to links 241, 242, and 243 one after another in pop-up windows while the document 141 is displayed on the screen. The display of a target web page in a pop-up window is convenient when browsing a collection of links, in which the audience may browse documents of the different link targets one after another while browsing the original document. However, no target attribute is specified in the link 244. Therefore, the browser changes the display from the original page to the linked page when the link button is clicked, rather than displaying the linked page in a pop-up window. Since the documents change when the link 244 is clicked, the audience must look for a link to return the original document 141, or use a browser return button.

In this embodiment, the example of the disunity in the style of the hyperlink described above includes the disunity in the target attribute in the document, but is not limited to, and may further include a mismatch in the different color of some links, and in the different highlighted representation of the some links, due to the disunity in the style attribute.

(5) A Phantom Link

As shown in FIG. 7, the phantom link means a mismatch when the audience browses a document but cannot find a visible link in the document even though the link is described in the HTML description for the document. In FIG. 7A, there is an <A> tag for specifying the link target as "HIDDEN_URL" positioned between as the header "STOCK STATUS OF GX SERIES", and the tag <TABLE> indicating a table. There is, however, no character string or image between these <A> tags. Therefore, when the document 151 is browsed, the audience cannot notice that there is a link positioned between the header and the table as illustrated in FIG. 7B. A crawler can search for and follow such links, but it is difficult for the administrator to find these links. For example, suppose that the link target "HIDDEN_URL" is indicative of a confidential file such as a customer list. The information stored in the confidential file can be easily acquired by the crawler, however, since the link cannot be found by a human unauthorized access to the confidential information by the crawler may go undetected.

In this embodiment, the phantom link described above includes, but is not limited to, no visible hyperlink, and may further include the case where it is difficult to visually recognize the link through the browser because the hyperlink appearing on the source web page hyperlink is described as a transparent image, a small image or character, or an image or character which is the same color as that of a background. Even if it is possible to see the hyperlink, it may be impossible to distinguish the link from the body text, if the style of the hyperlink is the same as that of the body text and there is no highlighted representation. This case, therefore, is included in the phantom link because the link cannot be visually confirmed on the display screen of the browser.

(6) A Loop Link

Figures 8, 9:
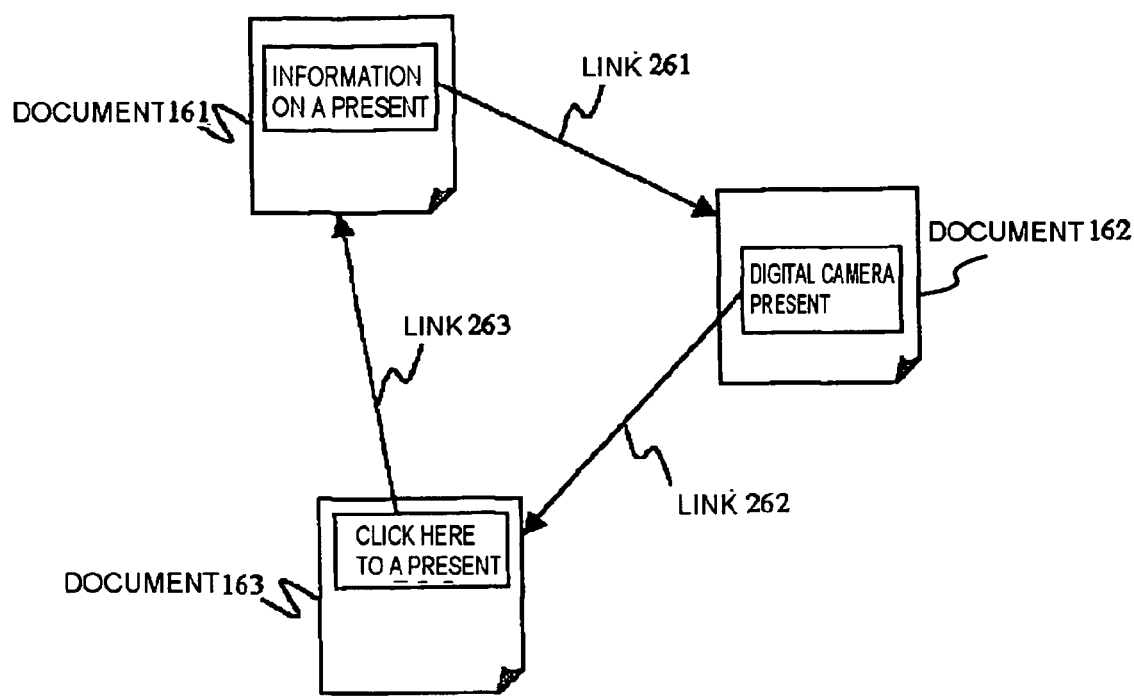
FIG. 8 is a diagram showing one example of a logically mismatch due to a loop link.
FIG. 9 is a table of an example of the link information stored in an information storing unit.

As shown in FIG. 8, the loop link means a mismatch where the audience sequentially follows links for certain information resulting in the return to the original page. In FIG. 8, the document 161 has a link 261 to the document 162 with the hyperlink appearing on the source web page hyperlink "Information about a present". The document 162 has a link 262 to the document 163 with the link description "Digital camera present". Finally, the document 163 has a link 263 to the document 161 with the hyperlink "Click here to a present". When the audience browsing the document 161 is interested in "Information about a present" in the document 161, the audience will follow the link 261. The audience may find that there is also the link 262 having the hyperlink "Digital camera present" in the document 162. Therefore, the audience may expect more information about the present to be followed by the next link, and then may access the document 163. However, the document 163 has the hyperlink "Click here to a present". Therefore, the audience may intend to acquire desired information and then follow the link 263. Ultimately, the link 263 will be followed to the original document 161. The audience may be confused about where to find the desired information. Thus, the loop link causes a problem that the audience will wander through documents without any desired information.

First Preferred Embodiment

Figure 1:
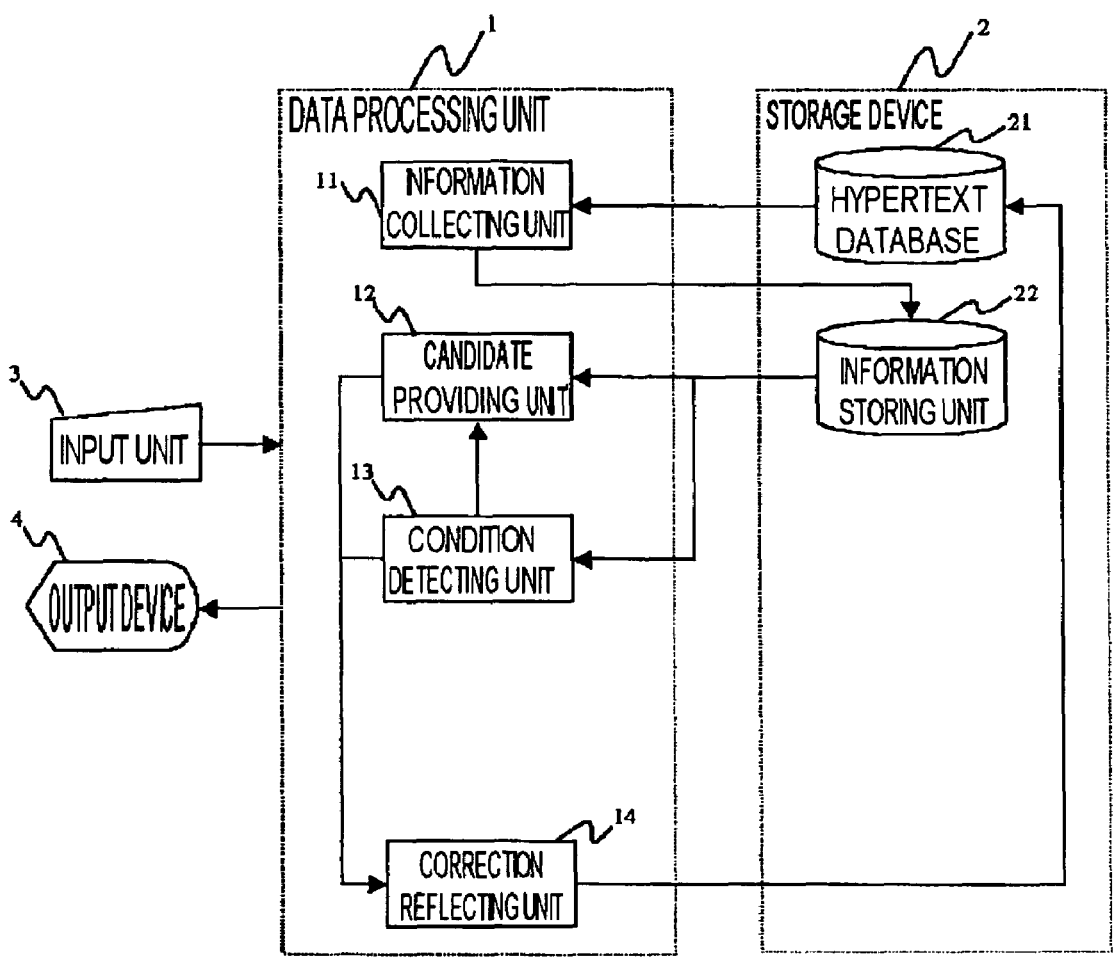
FIG. 1 is a block diagram of a first embodiment of the hypertext checking apparatus according to the present invention.

Referring now to FIG. 1 of the drawings, there is shown a first preferred embodiment of the hypertext checking apparatus according to the present invention.

Referring now to FIG. 1 of the drawings, the first embodiment of the hypertext checking apparatus according to the present invention includes a data processing unit 1 operated under program control, a storage device 2 capable of storing information, an input unit 3, such as a keyboard, and an output device 4, such as a displaying unit, a printer, and so on.

The data processing unit 1 includes an information collecting unit 11, a candidate providing unit 12, a condition detecting unit 13, and a correction reflecting unit 14.

The storage device 2 includes a hypertext database 21 and an information storing unit 22.

The information collecting unit 11 is designed to fetch documents from the hypertext database 21 included in the storage device 2, to retrieve link information, and to store the link information in the information storing unit 22. In this embodiment, the link information may include some items such as an address of the source web page, an address of the target web page, a hyperlink, a target attribute, a style attribute, and so on. The information storing unit 22 may record for the document, an updated date, a date and time of acquisition, and a condition when the document is acquired, such as an error or success, in addition to the link information.

The condition detecting unit 13 is designed to group the links stored in the information storing unit 22 in accordance with the link information, and to extract a particular link among the links grouped in a same group as a mismatched link, from the information storing unit 22.

The candidate providing unit 12 is designed to provide a correction candidate corresponding to the link which is extracted as the mismatched link by the condition detecting unit 13. In this embodiment, the correction candidate includes information about: which of the items of the link information of the mismatched link should be corrected, and how to be corrected. The candidate providing unit 12 outputs the correction candidate to the correction reflecting unit 14.

The correction reflecting unit 14 is designed to allow the administrator to confirm the outputted mismatched link and the correction candidate so as to reflect the confirmed result to the hypertext database 21.

The hypertext database 21 is capable of storing therein a set of hypertexts included in targeted sites to be inspected. The local storage device 2 does not need to include the entire hypertext database 21, and some parts of the hypertext database 21 may be distributed among a network, like that a group of hypertexts are distributed among an Internet.

The information storing unit 22 is capable of storing therein an information about links included in each documents in the hypertext database 21. FIG. 9 shows an example of the link information. For example, the link information included in the document 101 shown in FIGS. 2A and 2B is illustrated in FIG. 9. It will be understood from FIG. 9 that the document 101 has: a link 201 which is linked to the document 102 by way of a hyperlink "GX0011"; a target attribute of which is designated by "_blank"; and a style attribute of which is designated by "st01". Although the hyperlink is described as a text format in this embodiment, the hyperlink may be designated by an address of the specified image file when the hyperlink is specified as an image. Furthermore, there may be provided a character recognition module. The character recognition module may be executed upon the image file so as to extract a text embedded in the image and to store the extracted text in the information storing unit 22.

The operation of the hypertext checking apparatus of the first embodiment will be described in the followings with reference to FIGS. 1, and 9 to 13.

Figure 10:
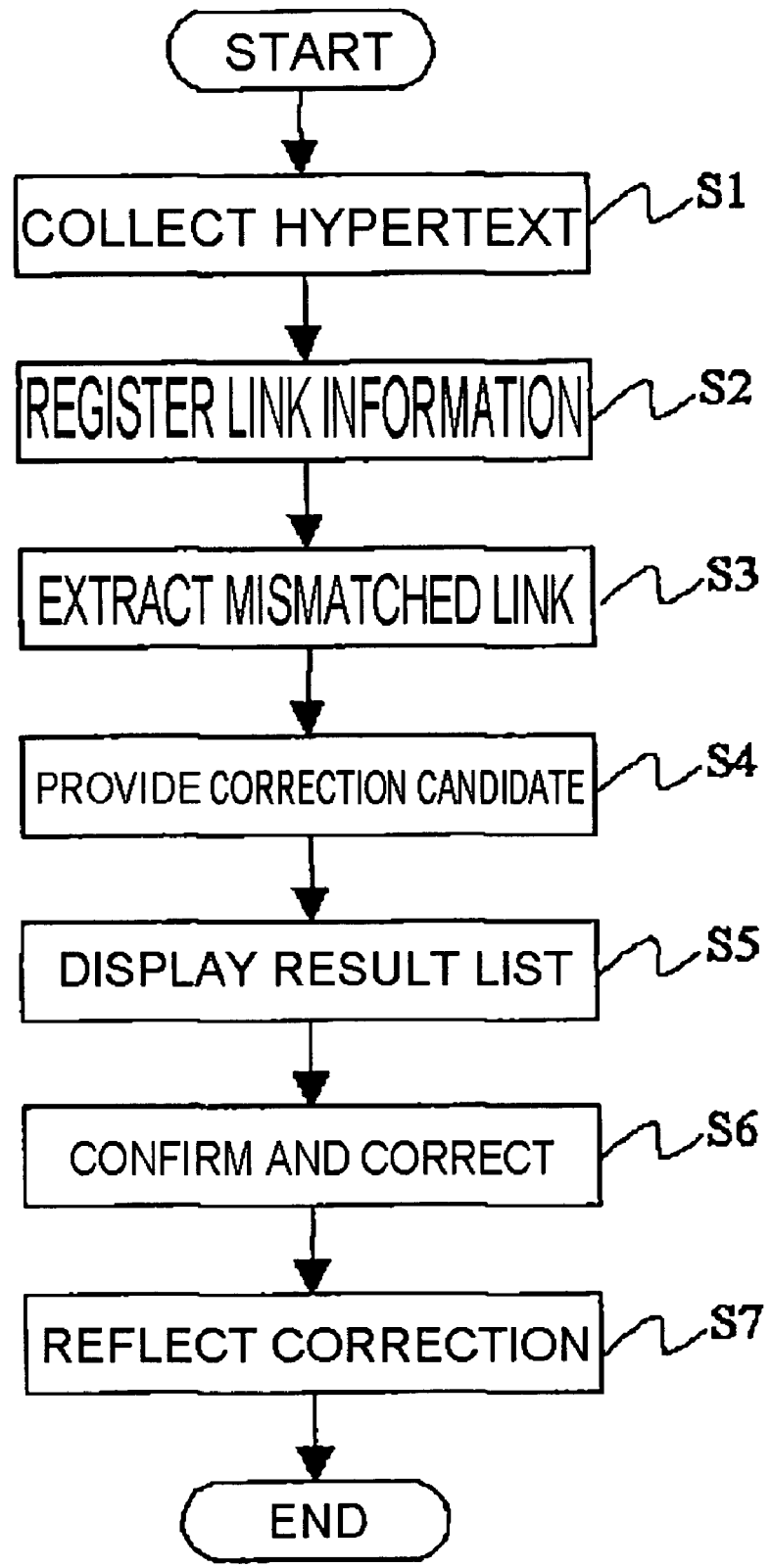
FIG. 10 is a flowchart showing the operation of the first embodiment of the hypertext checking apparatus according to the present invention shown in FIG. 1.

Firstly, the information collecting unit 11 is operated to read out the document from the hypertext database 21 based on the collection condition setting inputted by the input unit 3 (the step S1 in FIG. 10). In this embodiment, the document may be accessed by way of a HTTP (Hyper Text Transfer Protocol) when the hypertext database 21 is WWW (World Wide Web). Conventionally, such function has been implemented with a Web browser, such as an IE (Internet Explorer produced by Microsoft Corporation) or Web search engines of a robot type, so-called a crawler or a spider.

Figure 11:
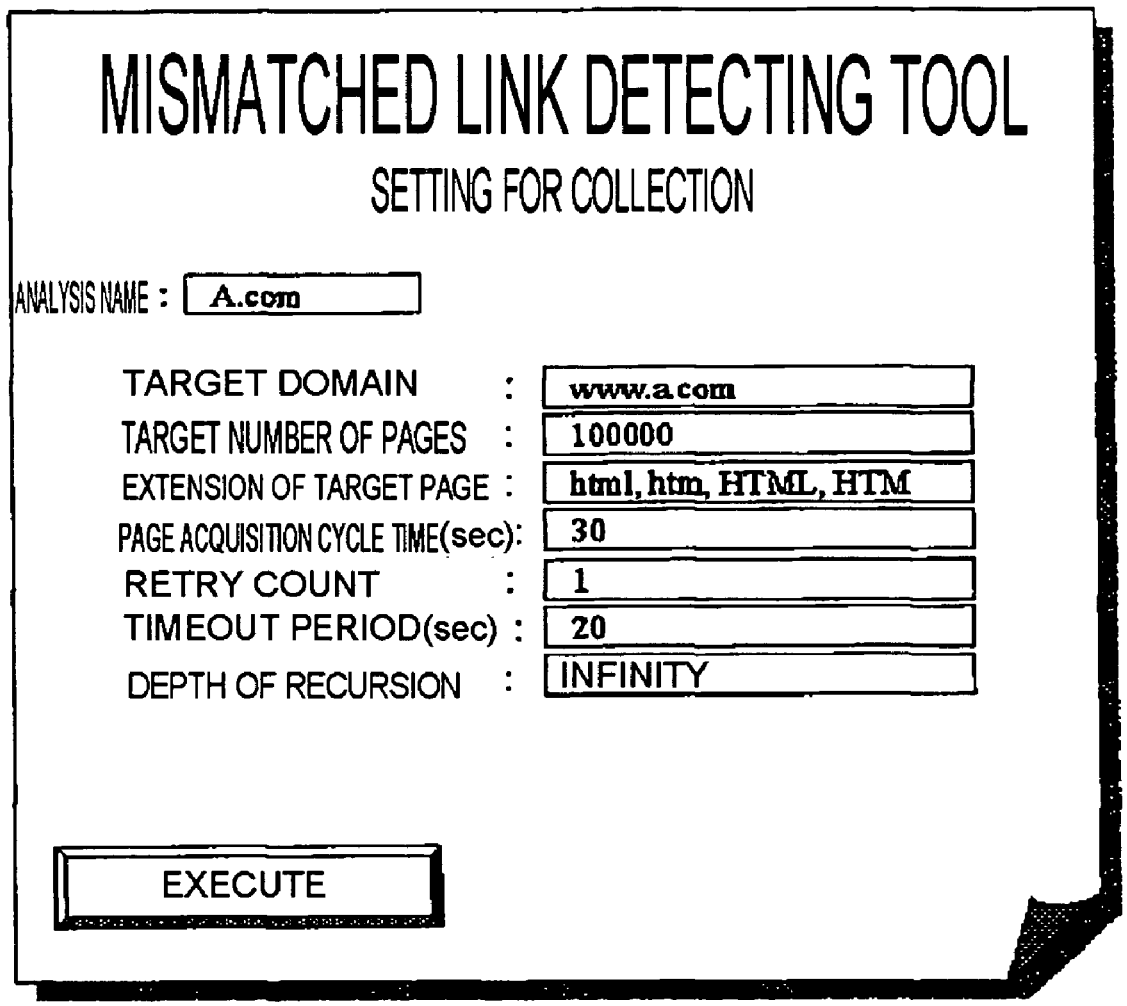
FIG. 11 is a diagram of an example of a display screen for setting a document collection condition in the first embodiment of the hypertext checking apparatus according to the present invention.

There is shown in FIG. 11 a display screen of a setting for the collection when the hypertext database 21 is WWW. As shown in FIG. 11, this display screen is designed to allow the user to specify: a domain name of the site for an analysis target; a target number of pages for documents to be collected; a file extension of the target document; a time interval between accesses to the server; a retry count for failure in collection; a timeout duration for the collection; and a depth of a hierarchy of the recursion when the information are recursively collected by following links. In FIG. 11, the display screen further includes an execute button which is operated to initiate the collection of the hypertexts.

Next, the HTML descriptions of the collected documents are analyzed by the information collecting unit 11, so that the link information are extracted as shown in FIG. 9 and then stored in the information storing unit 22 (the step S2 in FIG. 10).

The condition detecting unit 13 is then operated to extract the link which fulfills the extraction condition as the mismatched link from the information storing unit 22 based on the extraction conditions inputted by the input unit 3 (the step S3 in FIG. 10).

Figure 12:
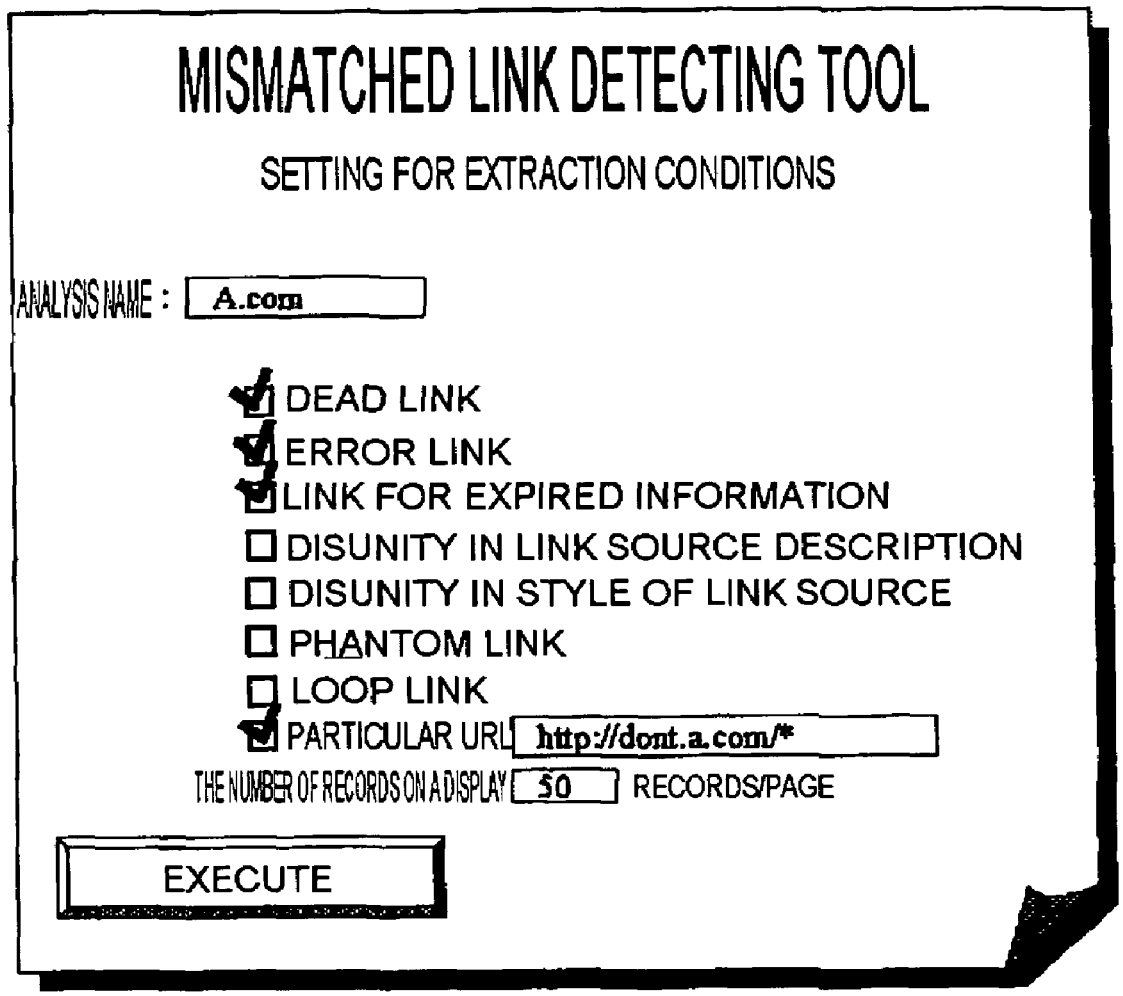
FIG. 12 is a diagram of an example of a display screen for setting an extraction condition for the mismatched link in the first embodiment of the hypertext checking apparatus according to the present invention.

There is shown in FIG. 12 a display screen of a setting for the extraction conditions. As shown in FIG. 12, the display screen is designed to allow the user to specify which kinds of mismatched links, such as a dead link, i.e., a physical mismatched link, an error link, a link for expired information, inconsistency in hyperlinks, inconsistency in the styles of hyperlinks, a phantom link, and a loop link, is to be extracted. When the link for a particular address is already proved as the mismatched link, this address can be inputted to a "particular URL" column as shown in FIG. 12, so that the link including the link target having the inputted address can also be extracted. When too many mismatched links are extracted, the number of records of mismatched links can be specified by limiting the number of records to be displayed on a display screen. There is also provided an execute button for allowing the user to issue instruction to start the extraction of the mismatched link.

The extraction of the dead link among some kinds of the mismatched links can be realized by the aforesaid conventional method, thereby omitting the descriptions in this embodiment. The method of extracting the link having a particular URL for a link source is obvious to those skilled in the art, thereby also omitting the descriptions in this embodiment. The description of the method of extracting remaining logically mismatched links will be described in the followings.

The candidate providing unit 12 is then operated to provide a correction candidate so as to eliminate the mismatch in the link extracted as the mismatched link by the condition detecting unit 13 (the step S4 in FIG. 10), and to output a list of the results on a display screen (the step S5 in FIG. 10).

There is shown in FIG. 13 an example of the display screen of the list of the results of extracted mismatched link. The list of the results has a plurality of items such as kinds of mismatched links, a correction candidate, a link ID, a source web page, a target web page, a hyperlink, a target attribute, and a style attribute. As shown in FIG. 13, the links are divided into groups such that the links having the same "target web page" and "hyperlink" are grouped in a same group. The grouped links are respectively given kinds of mismatched link and correction candidates and then displayed on the display screen.

When the link source address or the link target address is clicked, the corresponding document can be accessed. The correction candidate outputted by the system is indicated in the column of the "correction candidate". The column of the "correction candidate" has two sections divided by a colon ":", one of which includes items of the link information to be corrected and the other of which includes information about how to correct. For example, the representation "link: delete" means that the link should be deleted. The representation "hyperlink: "What's New"" means that the hyperlink should be changed to "What's New". This correction candidate may be re-written by the administrator after confirming.

The administrator can then confirm the mismatched link and the correction candidate outputted on the list (the step S6 in FIG. 10). Referring to FIG. 13, the links having the same target web page and hyperlink are grouped. Therefore, once the administrator confirms a representative example of each of the mismatched links, the administrator does not need to confirm all of the links. For example, it is understood from the list of the results shown in FIG. 13 that all of the links having the link IDs 271 to 274 have the same target web page indicative of the document 175, the same hyperlink indicative of "○× campaign now underway", the kind of mismatched link indicative of the link for the expired information, and the correction candidate indicative of "link: delete". Therefore, it is understood that all of the links of the link IDs 271 to 274 should be deleted. All the administrator has to do is to access the document 171 to confirm the validity of the mismatched link and correction candidate of the link 271. The administrator dose not have to confirm all of the remaining links 272 to 274. Therefore, it is possible to cut a cost of the confirmation.

When there are a plurality of correction candidates, the administrator may be provided with a plurality of correction candidates, such as "link target: document 1770R hyperlink: product B" in FIG. 13, which are partitioned by "OR". In this case, the administrator may select a necessary correction candidate based on the result of the confirmation. When the administrator judges that the correction candidate is wrong in accordance with the result of the confirmation, the administrator may correct this error. For example, the correction candidate of the links 278 and 279 are indicative of "hyperlink: What's New" in FIG. 13. The correction candidate can be changed to "target web page: document 180", if the administrator considers that it is appropriate that the target web page address should be changed to the document 180. When the administrator judges that the correction should not be done, the column of the correction candidate may be brought into a blank, thereby making it possible to cancel the correction in the following step.

When the administrator operates the button of "reflect correction" shown in FIG. 13, the correction reflecting unit 14 is operated to correct each of the documents in the hypertext database 21 in accordance with the correction candidates confirmed by the administrator (the step S7 in FIG. 10). When there are a plurality of correction candidates which are still connected with each other by "OR" at this stage, only the first correction candidate may be reflected.

The display screen of the list of the results further includes links "sort" at the items of the source web page, the target web page, and the hyperlink, as shown in FIG. 13. These links are adapted to sort records of the result of extraction by using each item as the sort key. For example, in response to a click of the link "sort" of the item "link source", the records of the result of extraction can be sorted by the link source document. Therefore, it is possible to grasp a tendency for each kind of the mismatched links to occur, for this reason, it is usable to correct the mismatched link by hands. In response to a click of the link "sort" of the item "link target", the records of the result of extraction can be sorted by the link target document. Therefore, it is possible to grasp a situation in occurrence of the mismatched link in a particular document, for this reason, the mismatched link caused to an important document, such as a document inundated with accesses, can be investigated. In response to a click of the link "sort" of the item "hyperlink", the records of the result of extraction can be sorted by the hyperlink. Therefore, it is possible to grasp a tendency for each kind of the hyperlink to cause the mismatch, for this reason, the suitability of the expression for the hyperlink can be investigated.

Although it is described in this embodiment that the administrator corrects the hyperlink, the target web page, and so on, in the column of the "correction candidate" displayed on the display screen of the list of the results in FIG. 13 is described, it is not limited to that embodiment. The administrator may directly re-write the records in the columns such as "link source", the "link target", and the "hyperlink" on the display screen. Further, although it is described in this embodiment that the display screen of the setting for the collection of the hypertexts and the display screen of the setting for the extraction conditions are separately provided, a single display may be provided for setting for the collection of the hypertexts and setting for the extraction conditions at the time of starting the analysis in another embodiment. In this case, steps S1 to S5 shown in FIG. 10 may be automatically performed. The present invention is not limited to the embodiments described above.

Furthermore, although it is described in this embodiment that the administrator confirms the outputted mismatched link and the correction candidate in the step S6, the step S6 may be omitted and the rest of the steps, steps S1 to S7, may be automatically performed in another embodiment. The present invention is not limited to the embodiments described above.

Furthermore, although it is described in this embodiment that the administrator decides the timing to start the analysis, it is not limited to that embodiment. In another embodiment, there may be provided a method having the steps of: previously setting the collection and extraction conditions; automatically performing the steps S1 to S5 at fixed intervals; and notifying the administrator of the obtained result by an electronic mail or the like. The present invention is not limited to the embodiments described above.

An Embodiment of the Detection of the Error Link

The operations of the condition detecting unit 13 and the candidate providing unit 12 will be described in detail in the followings, with reference to FIGS. 3, 14 and 15A to 15D. In this embodiment, the information storing unit 22 is capable of storing the link information about the group of documents shown in FIG. 3.

Firstly, the condition detecting unit 13 is operated to read out the link information from the information storing unit 22 to divide the links into some groups in accordance with the link information. The condition detecting unit 13 divides links having the same hyperlink into a group. Then, the condition detecting unit 13 further divides the links having the same link target into a sub-group. Then, the condition detecting unit 13 extracts the links which have the different link target. The condition detecting unit 13 is further operated to give an criteria score to each of the links in accordance with the number of links included in the sub-group (the step T11 in FIG. 14).

FIG. 15A shows an example of the links extracted and the criteria scores given in the step T11. It can be understood from FIG. 15A that the links 211, 212, 213, and 214 are grouped as these links have a same hyperlink "GX0011", while the links 215, and 216 are grouped as these links have a same hyperlink "GX0012". The three links 211, 212 and 213 in the group having the hyperlink "GX0011" are further sub-grouped as these links have a same link target "document 116", while the link 214 is grouped into a sub-group having the link target "document 117". The link 215 in the group having the hyperlink "GX0012" is grouped into a sub-group having the link target "document 116", while the link 216 is grouped into a sub-group having the link target "document 117".

The method of giving the criteria score includes the steps of: setting the criteria score for each of the groups to "1"; setting the criteria score for each of the sub-groups to a value which is obtained by distributing the criteria score into the number in inverse proportion to the number of links in the sub-groups, and setting the criteria score for each of the links to a value which is obtained by dividing the criteria score of each of the sub-groups equally into the number of the links in the sub-groups.

For example, as shown in FIG. 15A, the group of the hyperlink "GX0011" is given the criteria score "1". When the criteria score is distributed into the number in inverse proportion to the number of the links in the sub-group, the sub-group of the link target address "document 116" is given the criteria score "¼", while the sub-group of the link target address "document 117" is given the criteria score "¾". The criteria score of the sub-group "¼" is divided equally into three links 211, 212, and 213, thereby giving the criteria score for each of the links 211, 212, and 213 "$\frac{1}{12}$". Similarly, each of the links 215 and 216 is given the criteria score "½".

Figure 14:
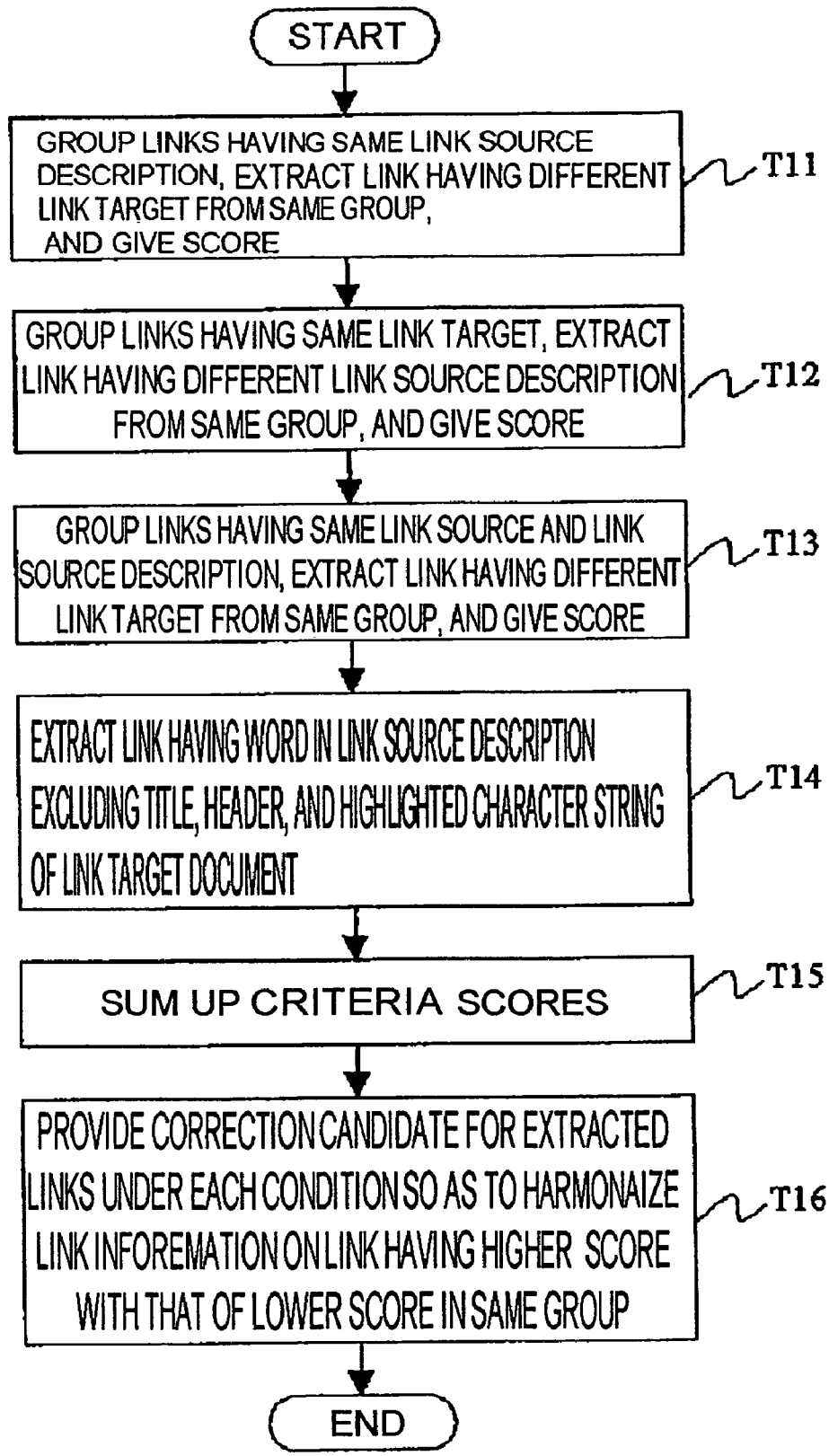
FIG. 14 is a flowchart showing the process of extracting the error link in the first embodiment of the hypertext checking apparatus according to the present invention.

In the following step T12 in FIG. 14, the condition detecting unit 13 is operated to read out the link information from the information storing unit 22 to divide the links into some groups in accordance with the link information. The condition detecting unit 13 divides links having the same link target into a group. Then, the condition detecting unit 13 further divides the links having the same hyperlink into a sub-group. Then, the condition detecting unit 13 extract the links which have the different hyperlink. The condition detecting unit 13 is further operated to give an criteria score to each link in accordance with the number of links included in the sub-group.

FIG. 15B shows an example of the links extracted and the criteria scores given in the step T12. It can be understood from FIG. 15B that the links 211, 212, 213, and 215 are grouped as these links have a same link target "document 116", while the links 214, and 216 are grouped as these links have a same link target "document 117". The three links 211, 212 and 213 in the group having the link target "document 116" are further sub-grouped as these links have a same hyperlink "GX0011", while the link 215 is grouped into a sub-group having the hyperlink "GX0012". The link 214 in the group having the link target "document 117" is grouped into a sub-group having the hyperlink "GX0011", while the link 216 is grouped into a sub-group having the hyperlink "GX0012".

The method of giving the criteria score is the same as the step T11. Thus, in the step T12, the criteria score of each of the links 211, 212 and 213 becomes "$\frac{1}{12}$", the criteria score of the link 215 becomes "¾", and the criteria score of each of the links 214 and 216 becomes "½".

In the following step T13 in FIG. 14, the condition detecting unit 13 is operated to read out the link information from the information storing unit 22 to divide the links into some groups in accordance with the link information. The condition detecting unit 13 divides links having the same link source and hyperlink into a group. Then, the condition detecting unit 13 further divides the links having the same link target into a sub-group. Then, the condition detecting unit 13 extracts the links which have the different link target. The condition detecting unit 13 is further operated to give an criteria score to each link in accordance with the number of links included in the sub-group.

FIG. 15C shows an example of the links extracted and the criteria scores given in the step T13. It can be understood from FIG. 15C that the links 215 and 216 are grouped in a same group as these links have a same link source "document 115" and hyperlink "GX0012". The link 215 is further grouped into a sub-group having the link target "document 116", while the link 216 is grouped into a sub-group having the link target "document 117".

The method of giving the criteria score is also the same as the step T11. Thus, in the step T13, the criteria score of the links 215 and 216 are "½".

In the following step T14 in FIG. 14, the condition detecting unit 13 is operated to read the link information from the information storing unit 22 to extract the links the hyperlink of which includes words that is not included in the title, the header or the highlighted character string in the link target document thereof in accordance with the link information. The condition detecting unit 13 gives the criteria score "1" to each of the extracted links.

FIG. 15D shows an example of the links extracted and the criteria scores given in the step T14. It can be understood from FIG. 3 that as for the links 214 and 215 shown in FIG. 15D, the words included in the hyperlink are not expressed in the links target documents.

In the following step T15, the condition detecting unit 13 is operated to sum up the criteria score of each of the links. Therefore, the criteria score of each of the links 211, 212, and 213 becomes "⅙" obtained by an equation "$\frac{1}{12}+\frac{1}{12}=\frac{1}{6}$". The criteria score of the link 214 becomes "9/4" obtained by an equation "$\frac{3}{4}+\frac{1}{2}+1=\frac{9}{4}$". The criteria score of the link 215 becomes "1¼" obtained by an equation "½+¾+½+1=1¼". The criteria score of the link 216 becomes "3/2" obtained by an equation "½+½+½=3/2".

In the following step T16 in FIG. 14, the condition detecting unit 13 is operated to compare the sums of the criteria scores of sub-groups, and to then extract the links having the higher criteria score as a mismatched link. The candidate providing unit 12 provides the correction candidate for extracted links under each condition so as to harmonize link information about the link having the higher score with that of the lower score in a same group.

As shown in FIG. 15A, in the group of the hyperlink "GX0011", the sum of the criteria scores of the sub-group including the links 211, 212 and 213 becomes "½" obtained by an equation "⅙+⅙+⅙=½", and the sum of the criteria scores of the sub-group including the link 214 becomes "¾". Therefore, the link 214 which has the higher criteria score is decided as the mismatched link in this case. In order to harmonize the link information about the link 214 with that of the sub-group including the links 211, 212 and 213, it can be understood that the correction candidate for the link 214 is appropriately obtained as "link target: document 116".

Furthermore, in the group of the hyperlink "GX0012" in FIG. 15A, the sum of the criteria scores of the sub-group including the link 215 becomes "1¼", and the sum of the criteria scores of the sub-group including the link 216 becomes "3/2". Therefore, the link 215 is decided as the mismatched link in this case. In order to harmonize the link information about the link 215 with that of the sub-group including the link 216, it can be understood that the correction candidate for the link 215 is appropriately obtained as "link target: document 117". By the same token, in FIG. 15B, the link 215 is decided as the mismatched link, and the correction candidate thereof is decided as "hyperlink: "GX0012". By the same token, in FIG. 15C, the link 215 is decided as the mismatched link, and the correction candidate thereof is decided as "target web page: document 117". It is understood from the above results that the mismatched links are the links 214 and 215, and the correction candidates of the links 214 and 215 are "link target: document 116" OR "hyperlink: GX0012", and "target web page: document 117" OR "the hyperlink: GX0011", respectively.

Although it is described in this embodiment that the link having the higher sum of the criteria score is decided as the mismatched link, it is not limited to that example. In another embodiment, there is provided a method of deciding the mismatched link having the steps of: setting a predetermined threshold for the criteria score; and deciding the link as the mismatched link only when the criteria score thereof is higher than the threshold even if the criteria score thereof is higher than those of others. The present invention is not limited to the embodiments as described above.

Furthermore, although it is described in this embodiment that the criteria score is calculated, for example, based on the number of the links in each of the sub-groups, but it is not limited to that example. The criteria score may be simply the number of extractions. In another embodiment, there may be provided a method of calculating the criteria score having the steps of: specifying a characteristic vector of the link as the number of links in the sub-group; preparing a characteristic vector of the mismatched link as a teaching data; and calculating a mean of distance between the characteristic vector of the link and the characteristic vector of the mismatched link to obtain the criteria score. The present invention is not limited to the embodiments described above.

Furthermore, although it is described in this embodiment that the extraction conditions of the error link are calculated by summing up the criteria scores including: (1) a first criteria score calculated by comparing the hyperlinks of the plural links for the same target web page; (2) a second criteria score calculated by comparing the target web pages of a plurality of links represented by the same hyperlink; (3) a third criteria score calculated by comparing the target web pages based on a plurality of links for the same link source page and the same hyperlink; and (4) a fourth criteria score calculated by comparing the hyperlink and the target web page in the contents, but it is not limited to that example. In another embodiment, the criteria score may be calculated according to at least one of the above criteria scores, or according to the weighted criteria scores based on each of conditions. The present invention is not limited to the above embodiments of the method.

An Embodiment of the Detection of the Expired Link

The operations of the condition detecting unit 13 and the candidate providing unit 12 in the detection of the expired link will be described in detail in the followings with reference to FIGS. 4 and 16 of the drawings.

Firstly, the condition detecting unit 13 is operated to extract links including dated expressions in the hyperlink thereof, or indicating documents including dated expressions. Then, the condition detecting unit 13 calculates the expiration date of the dated expression related to the extracted link, and to judge whether the present date and time is prior to the expiration date or not (the step T21 in FIG. 16).

In the following step T22 in FIG. 16, the condition detecting unit 13 is operated to extract the expired expression from the link target document related to the extracted link. In this embodiment, the expired expression means an expression more commonly used for a notice sentence when the service is terminated, closed, or moved, such as "Closed.", "Moved.", "Ended.", "Automatically jump after a few seconds.", "effective in [date]", "We appreciated your past patronage.", "We appreciated your past participation.", and so on. Besides the above expired expression, if the description in the HTML is indicated that the document can be automatically jumped after a few seconds, this is extracted as the expired expression.

In the following step T23 in FIG. 16, the condition detecting unit 13 calculates criteria score of the link by integrating the result judged whether the present date and time is included in the expiration date or not in the step T21, and the number of the expired expression extracted in the step T22. When this criteria score is higher or equal to a predetermined threshold, the link having the criteria score is outputted as the mismatched link.

There may be provided an example of the method of calculating the criteria score of the link including the step of multiplying the number of dates obtained as the expired date and the number of appearances of the extracted expired expressions together. As for another embodiment, there may be provided a method of calculating the criteria score including the steps of: specifying a characteristic vector of the link based on the number of dates obtained as the expired date and the number of appearances of the extracted expired expressions; calculating a mean value of distances between the specified characteristic vector of the link and characteristic vectors of the mismatched link prepared as teaching data; and setting the mean value as the criteria score. The present invention is not limited to the embodiments described above.

In the following step T24, the candidate providing unit 12 is operated to extract the moved new address for the link outputted as the mismatched link from the link target document to specify the new address as the correction candidate.

In this embodiment, the new address means an address to which the document can be automatically jumped in accordance with the HTML. Instead of the automatic jump of the document, the expression "Click here.", or "Move to the following URL." may be extracted. Then, the target address of a link included in the expression or written in peripheral of the expression may be specified to be the correction candidate as the new address. When, on the other hand, the new address cannot be extracted, the correction candidate may be outputted as "link: delete".

An example of the operations of the condition detecting unit 13 and the candidate providing unit 12 will be described in the followings with reference to FIG. 4A. Here, the method of calculating the criteria score of the link including the step of multiplying the number of dates obtained as the expired date and the number of appearances of the extracted expired expressions together, as described above, is used.

Figure 16:
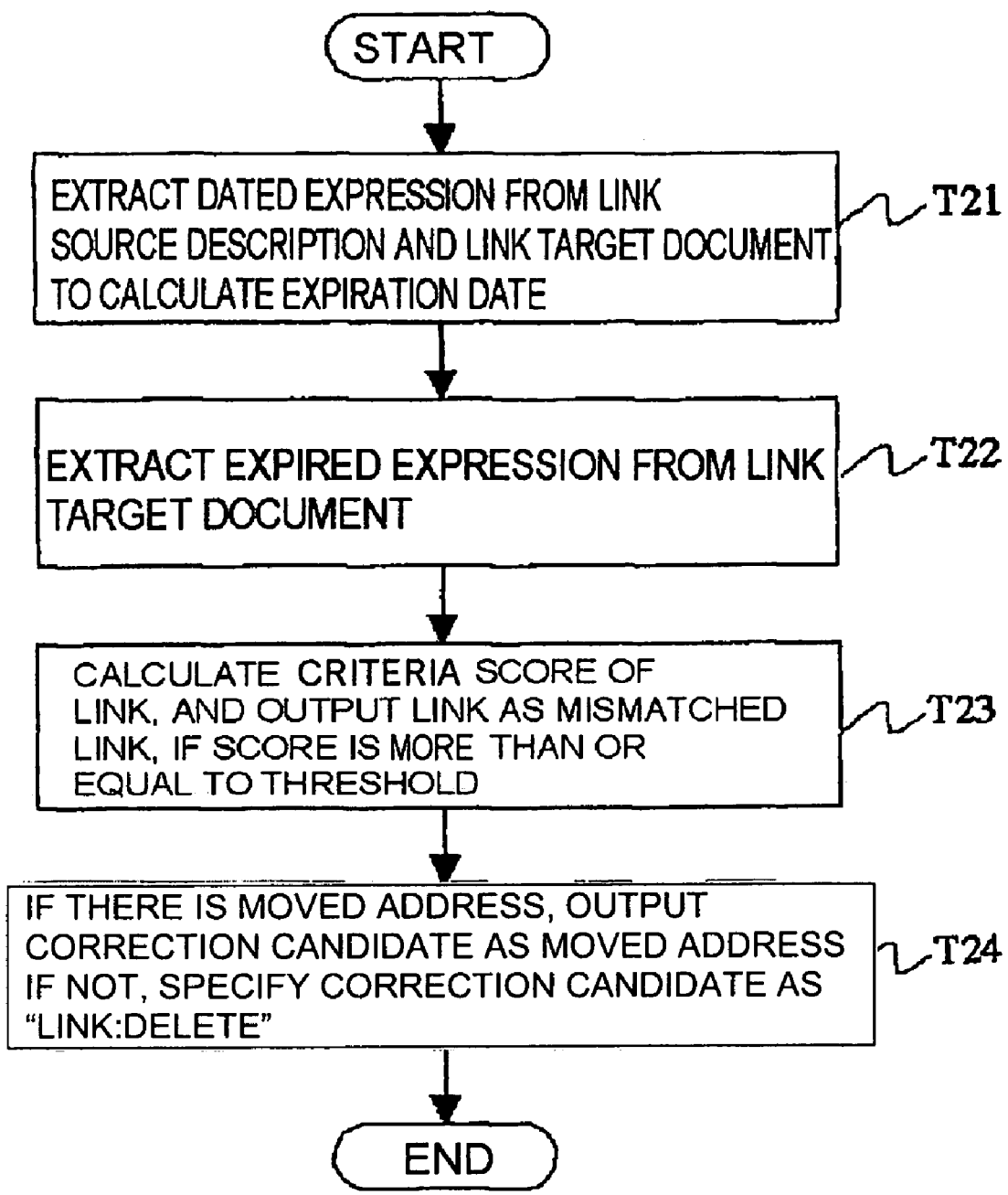
FIG. 16 is a flowchart showing the process of extracting the expiration period link in the first embodiment of the hypertext checking apparatus according to the present invention.

Referring also to the step T21 of FIG. 16, as the document 125 includes the dated expression such as "Jul. 20, 2002 to Aug. 31, 2002.", the condition detecting unit 13 is operated to extract the links 211, 222, 223, and 224. Assuming that the present date is Aug. 15, 2002, the condition detecting unit 13 judges that the present date is prior to the expiration date of the document 125, thereby judging the links 211, 222, 223, and 224 are not expired.

In the next step T22 of FIG. 16, nothing is extracted, as the document 125 does not include expired expression.

With the result obtained in the step T21 that the present date is prior to the expiration date, and the result obtained in the step T22 that no expressions expressing the expired date are extracted, both of the number of dates obtained as the expired date and the number of appearance of the extracted expired expression are calculated to be "0". Therefore, the criteria scores of the links 211, 222, 223, and 224 become "0" obtained by an equation "0×0=0". Therefore, it is judged that all of the links 221, 222, 223, and 224 are appropriate or suitable in the next step T23 of FIG. 16.

Another example of the operations of the condition detecting unit 13 and the candidate providing unit 12 will be described in the followings with reference to FIG. 4B.

Referring also to the step T21 of FIG. 16, as the document 125 includes the dated expression such as "Jul. 20, 2002 to Aug. 31, 2002.", the condition detecting unit 13 is operated to extract the link 224. Assuming that the present date is Sep. 15, 2002, the condition detecting unit 13 judges that the present date is over the is over the expiration date of the document 125, thereby judging the link 244 is expired.

In the next step T22 of FIG. 16, the condition detecting unit 13 is operated to extract the expired expression such as "Closed.".

With the result obtained in the step T21 that the present date is over the expiration date, and the result obtained in the step T22 that the expired expression such as "Closed." is extracted, the number of dates obtained as the expired date is calculated to be "15", and the number of appearance of the extracted expired expression is calculated to be "1". This leads to the fact that the criteria score of the link 224 is "15" obtained by an equation "15×1=15". Therefore, when the threshold is set as "10", it is judged that the link 224 is the mismatched link.

In the next step T24 of FIG. 16, the candidate providing unit 12 is operated to extract the new address. However, as the document 125, shown in FIG. 4B, does not include corresponding address, the candidate providing unit 12 cannot obtain the new address. Therefore, the candidate providing unit 12 outputs the "link: delete" as the correction candidate of the link 224.

Although it is described in this embodiment that the expired link is detected by the dated expression and the expired expression, but is not limited to this method. For example, the detecting method, similar to the detection of the error link as described above, includes the steps of: grouping the links having a same target web pages; and detecting sub-groups having the different hyperlink in the same group. Furthermore, in another embodiment, the detecting method may include the steps of: grouping the links having a same hyperlink; and detecting the sub-groups having the different link target in the same group.

An Embodiment of the Detection of the Inconsistency in the Hyperlinks

The operations of the condition detecting unit 13 and the candidate providing unit 12 for the detection of the inconsistency in the hyperlinks will be described in detail in the followings, with reference to FIGS. 5, 17 and 18 of the drawings.

Firstly, the condition detecting unit 13 is operated to read out the link information from the information storing unit 22 to divide the links into some groups in accordance with the link information. The condition detecting unit 13 divides links having the same link target into a group. Then, the condition detecting unit 13 further divides the links having the same hyperlink into a sub-group. Then, the condition detecting unit 13 extracts the links which have the different hyperlink. The condition detecting unit 13 is further operated to give an criteria score to each link in accordance with the number of links included in the sub-group, in the step T31 in FIG. 17.

Figures 17, 18:
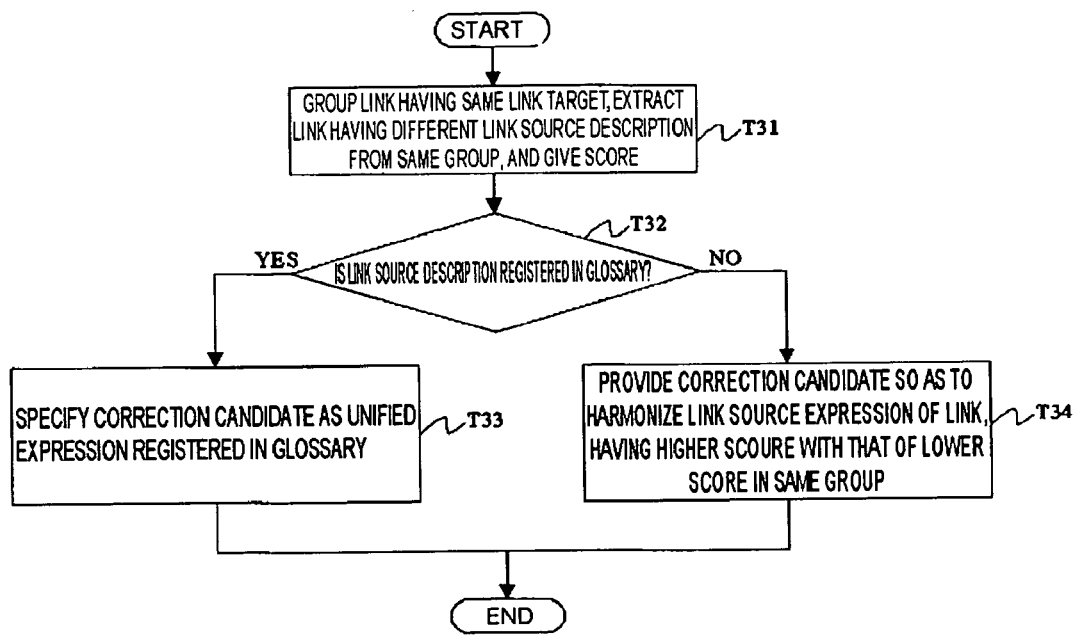
FIG. 17 is a flowchart showing the process of extracting the disunity in the hyperlinks in the first embodiment of the hypertext checking apparatus according to the present invention.
FIG. 18 is a table of an example of the link information in the step of the process of extracting the disunity in the hyperlinks shown in FIG. 17 in the first embodiment of the hypertext checking apparatus according to the present invention.

FIG. 18 shows an example of the link extracted and the criteria score given in the step T31, when the relationship between documents is as shown in FIG. 5. It can be understood from the description of FIG. 18 that the links 231, 232, 233, and 234 are grouped as these links have a same link target "document 135". The three links 231, 232, and 233 are further grouped into a sub-group of the same hyperlink "GX Series", while the link 234 is grouped into a sub-group of the hyperlink "gX Series".

The method of giving the criteria score includes the steps of: setting the criteria score for each of the groups to "1"; setting the criteria score for each of the sub-groups to a value which is obtained by distributing the criteria score into the number in inverse proportion to the number of links in the sub-groups, and setting the criteria score for each of the links to a value which is obtained by dividing the criteria score of each of the sub-groups equally into the number of the links in the sub-groups. Therefore, the criteria score of each of the links 231, 232, and 233, given in the step T31 of FIG. 17, becomes "1/12" while the criteria score of the link 234, also given in the step T31 of FIG. 17, becomes "3/4", as shown in FIG. 18.

The condition detecting unit 13 is then operated to compare the sums of the criteria scores of sub-groups, and to then extract the links having the higher criteria score as a mismatched link. In FIG. 18, the criteria score of the link 234 "3/4" is the higher than the sum of the criteria scores of the links 231, 232 and 233 "1/4". Therefore, the link 234 is extracted as the mismatched link.

In the following step T32 in FIG. 17, the candidate providing unit 12 is operated to investigate whether the hyperlink of the extracted links is registered in a glossary or not. In this embodiment, the glossary means a table having expressions to be unified with a key of fluctuation of description for a word. For example, a word "free software" means a software available without admission, and has a plurality of expression fluctuation of description, such as "free ware", and "free soft". When the administrator can unify these words into a word "free software", the words "free ware", and "free soft" are assumed to be the key, and the word "free software" is assumed to be a value. These words may be registered in the glossary.

When the hyperlink of the extracted link is already registered in the glossary, YES of the step T32 in FIG. 17, the candidate providing unit 12 is operated to output the correction candidate as the unified expression corresponding to the key, in the step T33 in FIG. 17. In order to fully absorb fluctuations of descriptions, fuzzy search may be performed when the key is searched. In another embodiment, the method of calculating the correction candidate may include the steps of: conducting fuzzy search for the unified expression without the words of the fluctuation of description; judging whether affinity level in character string is the higher or equal to a threshold or not; and assuming the correction candidate as the searched unified expression when the judgment is made that the affinity level in character string is the higher or equal to the threshold.

When, on the other hand, the hyperlink of the extracted link is not registered in the glossary, NO of the step T32 in FIG. 17, the candidate providing unit 12 provides the correction candidate to harmonize the hyperlink having the higher criteria score with that of the lower criteria score in the same group, in the step T34 in FIG. 17. In the case shown FIG. 18, the candidate providing unit 12 outputs "hyperlink: GX Series" as the correction candidate.

It is assumed that both of the words "GX Series", and "gX Series", shown in FIG. 18, are not registered in the glossary.

Although it is described in this embodiment that the criteria score is calculated, for example, based on the number of the links in each of the sub-groups, the present invention is not limited to the embodiments described above. In another embodiment, there is provided a method of calculating the criteria score having the steps of: specifying a characteristic vector of the link based on the number of links included in the sub-group; calculating a mean value of distances between the specified characteristic vector of the link and characteristic vectors of the mismatched link prepared as teaching data; and setting the mean value as the criteria score. The present invention is not limited to the embodiments described above.

An Embodiment of the Detection of the Inconsistency in the Styles of the Hyperlinks The operations of the condition detecting unit 13 and the candidate providing unit 12 for the detection of the disunity in the style of the hyperlink will be described in detail in the followings, with reference to FIGS. 6, 19 and 20 of the drawings.

Firstly, the condition detecting unit 13 is operated to read the link information from the information storing unit 22 to divide the links into some groups in accordance with the link information. The condition detecting unit 13 divides links having the same link source document into a group. Then, the condition detecting unit 13 further divide the links having the same target attribute into a sub-group. Then, the condition detecting unit 13 extracts the links which have the different target attribute. The condition detecting unit 13 is further operated to give an criteria score to each link in accordance with the number of links included in the sub-group, in the step T41 in FIG. 19.

Figures 19, 20:
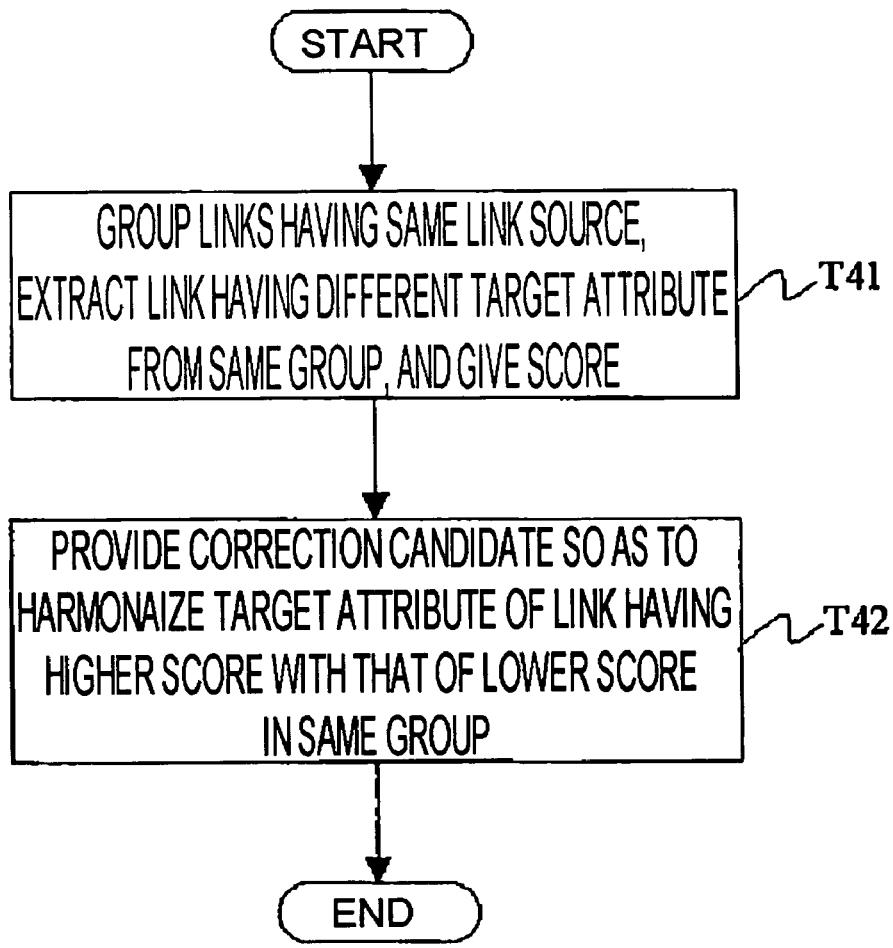
FIG. 19 is a flowchart showing the process of extracting the disunity in the styles of the link source pages in the first embodiment of the hypertext checking apparatus according to the present invention.
FIG. 20 is a table of an example of the link information in the step of the process of extracting the disunity in the styles of the link source pages shown in FIG. 19 in the first embodiment of the hypertext checking apparatus according to the present invention.

FIG. 20 shows an example of the links extracted and the criteria scores given in the step T41 in case where the relation between the documents is as shown in FIG. 6. It can be understood from FIG. 20 that the links 241, 242, 243, and 244 are grouped as these links have a same link source "document 141". The three links 241, 242, and 243 are further grouped into a sub-group of the same target attribute "_blank", while the link 244 is grouped into a sub-group of the target attribute "not specified".

The method of giving the criteria score includes the steps of: setting the criteria score for one of the groups to "1"; setting the criteria score for each of the sub-groups to a value which is obtained by distributing the criteria score into the number in inverse proportion to the number of links in the sub-groups, and setting the criteria score for each of the links to a value which is obtained by dividing the criteria score of each of the sub-groups equally into the number of the links in the sub-groups. Therefore, as shown in FIG. 20, in the step T41, the criteria score of each of the links 241, 242, and 243 becomes "1/12", while criteria score of the link 244 becomes "3/4".

The condition detecting unit 13 is then operated to compare the sums of the criteria scores of sub-groups, and to then extract the links having the higher criteria score as a mismatched link. In FIG. 20 the criteria score of the link 244 "3/4" is the higher than the sum of the criteria scores of the links 241, 242 and 243 "1/4". Therefore, the link 244 is extracted as the mismatched link.

In the following step T42 in FIG. 19, the candidate providing unit 12 provides the correction candidate to harmonize the target attribute having the higher criteria score with that of the lower criteria score in the same group. In the case shown in FIG. 20, the candidate providing unit 12 outputs "target attribute: _blank" as the correction candidate.

Although it is described in this embodiment that the targets to be grouped in the step T41 of FIG. 19 are the links having the same link source document, but the present invention is not limited to this embodiment. In another embodiment, there may be provided a method including the step of grouping the links having a same hyperlink and included in a particular area, such as a table, and a list of links into a same group. In another embodiment, there may be provided a method including the steps of: grouping the links among a plurality of documents, such as a particular document and the document stored in a same directory as the particular document, based on the style; and detecting the disunity in the link style of the page peripheral to the particular document.

In this embodiment, the method of detecting the disunity in the target attribute and calculating the correction candidate have been described above, the similar method of detecting disunity in style attributes and calculating the correction candidate may be provided.

In this embodiment, the criteria score is calculated, for example, based on the number of the links in each of the sub-groups. The present invention is not limited to this embodiment. In another embodiment, there is provided a method of calculating the criteria score having the steps of: specifying a characteristic vector of the link as the number of links in the sub-group; preparing a characteristic vector of the mismatched link as a teaching data; and calculating a mean of distance between the characteristic vector of the link and the characteristic vector of the mismatched link to obtain the criteria score.

An Embodiment of the Detection of the Phantom Link

The operations of the condition detecting unit 13 and the candidate providing unit 12 in the detection of the phantom link will be described in detail in the followings with reference to FIGS. 7 and 21 of the drawings.

Figure 21:
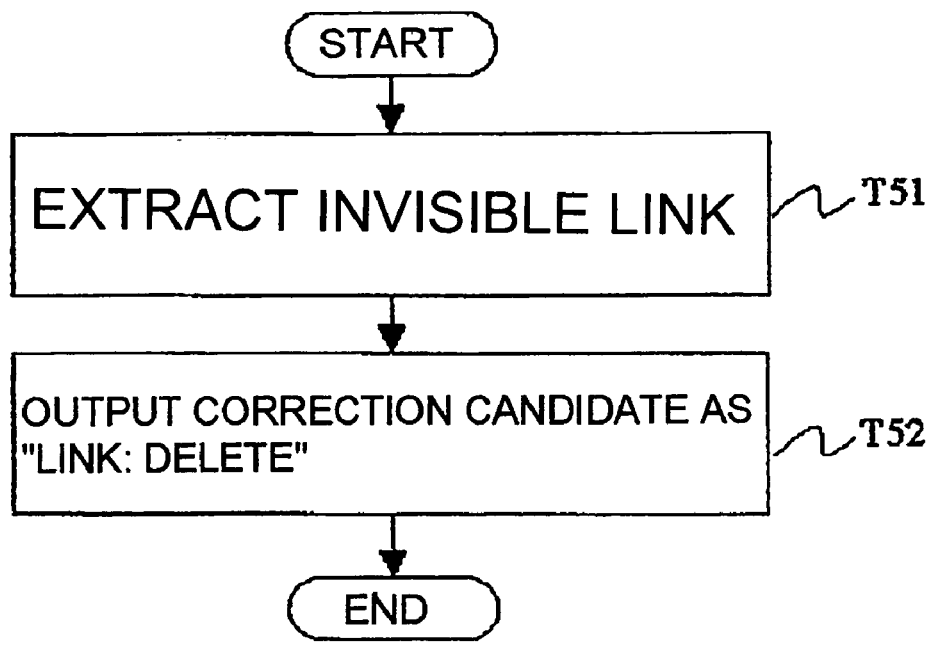
FIG. 21 is a flowchart showing the process of extracting the phantom link in the first embodiment of the hypertext checking apparatus according to the present invention.

Firstly, the condition detecting unit 13 is operated to read out the link information from the information storing unit 22, according to the link information, to extract the link having an invisible hyperlink, in the step T51 in FIG. 21. In this embodiment, the invisible hyperlink means a null character string, a transparent image, a considerable infinitesimally small image or character, or an image or character which is the same color as that of a background. In FIG. 7A, the link having a hyperlink specifying a null character string is extracted.

In the following step T52 in FIG. 21, the candidate providing unit 12 is operated to output the correction candidate so as to delete the link as "link: delete".

An Embodiment of the Detection of the Loop Link

The operations of the condition detecting unit 13 and the candidate providing unit 12 for the detection of the loop link or looped link will be described in detail in the followings, with reference to FIGS. 8 and 22 of the drawings.

Figure 22:
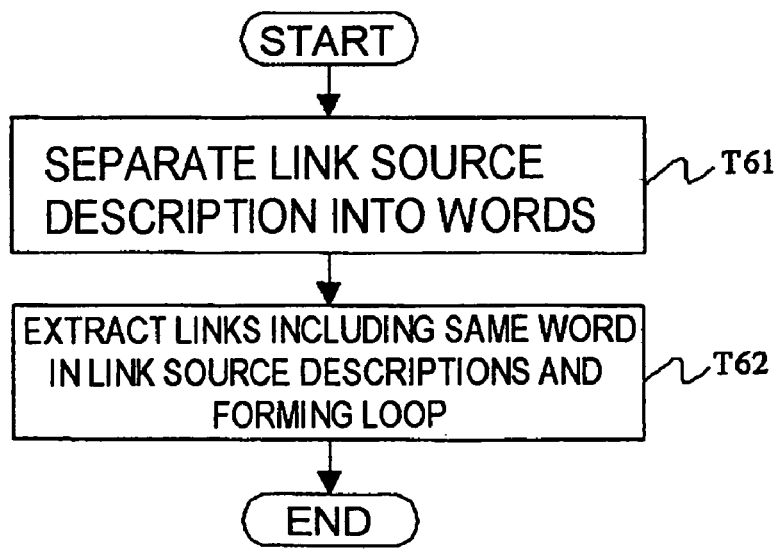
FIG. 22 is a flowchart showing the process of extracting the loop link in the first embodiment of the hypertext checking apparatus according to the present invention.

Firstly, the condition detecting unit 13 is operated to read out the link information from the information storing unit 22, to separate the hyperlink of the link read from the information storing unit 22 into words, in the step T61 in FIG. 22. The method of separating the hyperlink into words may be performed by conducting a morphological analysis, separating the hyperlink at the change of sorts of characters, or separating the hyperlink at every several letters.

In the following step T62 in FIG. 22, the condition detecting unit 13 is operated to extract a group of links forming a loop and identical in the words in the hyperlink corresponding to the loop link. In FIG. 8, all of the links 261, 262 and 263 including a word "present" form a loop, and therefore are assumed to be a loop link to be outputted.

Although it is described in this embodiment the method of extracting the loop links in which all of the hyperlink includes the same word, the present invention is not limited to this embodiment. In another embodiment, there may be provided a method including the steps of: preparing a dictionary including characteristic words classified under each of the specific topics; and extracting the loop links by judging whether each of the hyperlinks includes the characteristic words classified for the same topic. The present invention is not limited to the embodiments described above.

A Method of Detecting Mismatched Link Focused on a Change with Time

Although it is described in this embodiment the method of detecting some kinds of the mismatched links based on the link information of each of the links collected at a same time, the present invention is not limited to this embodiment. In another embodiment, there may be provided the method of detecting all kinds of mismatched links including the steps of: repeating the collection of the link information periodically; and detecting all kinds of mismatched links by focusing on a change in the link information in accordance with time. The operations of the condition detecting unit 13 and the candidate providing unit 12 in method of detecting mismatched link focused on a change in accordance with time will be described in the followings with reference to FIGS. 1, 4, 23 and 24 of the drawings.

The information storing unit 22, shown in FIG. 1, is adapted to store therein the link information at times T and T'.

Figure 23:
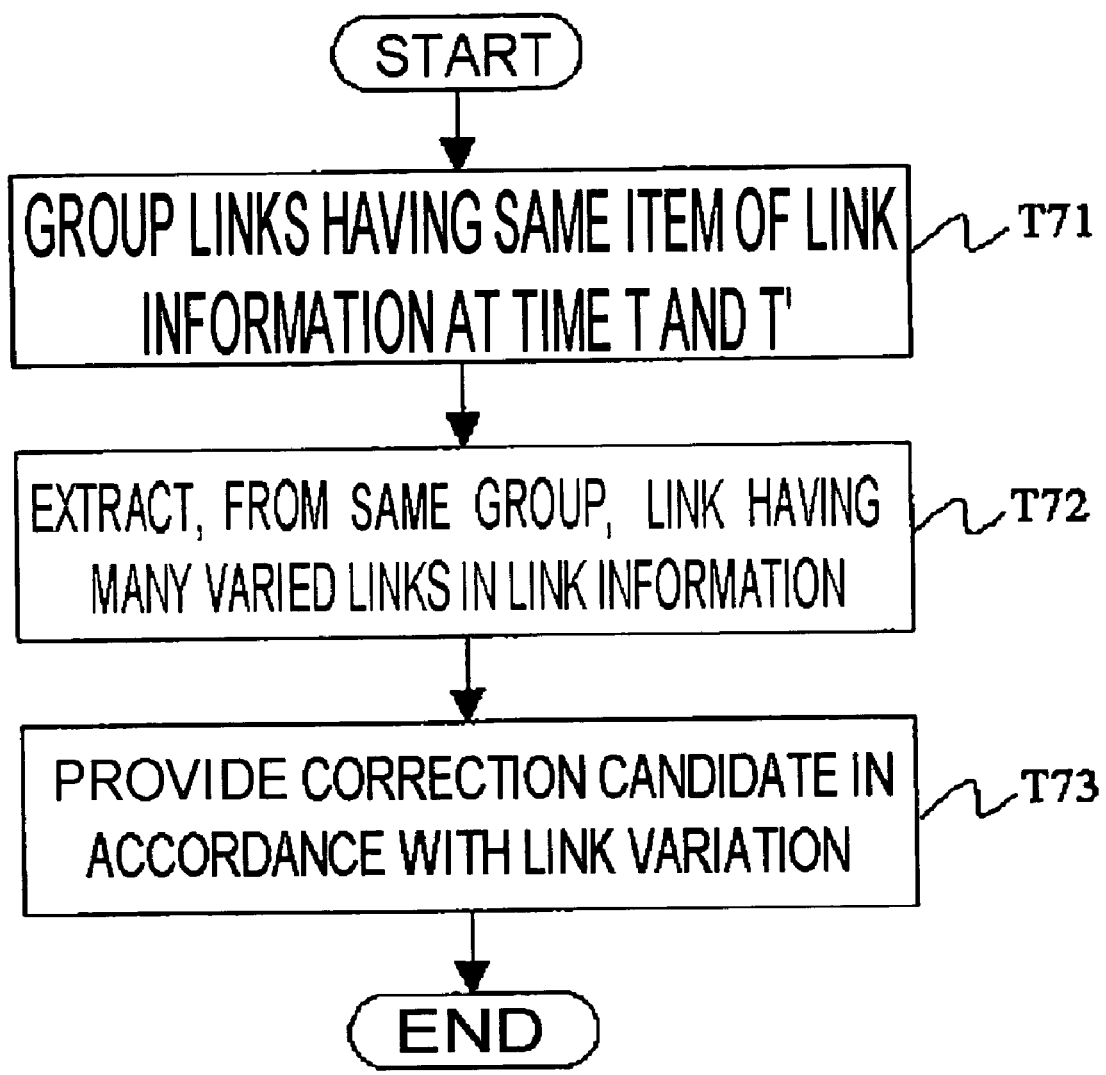
FIG. 23 is a flowchart showing the process of extracting the link varied with time in the link information in the first embodiment of the hypertext checking apparatus according to the present invention.
Figures 24, 25:
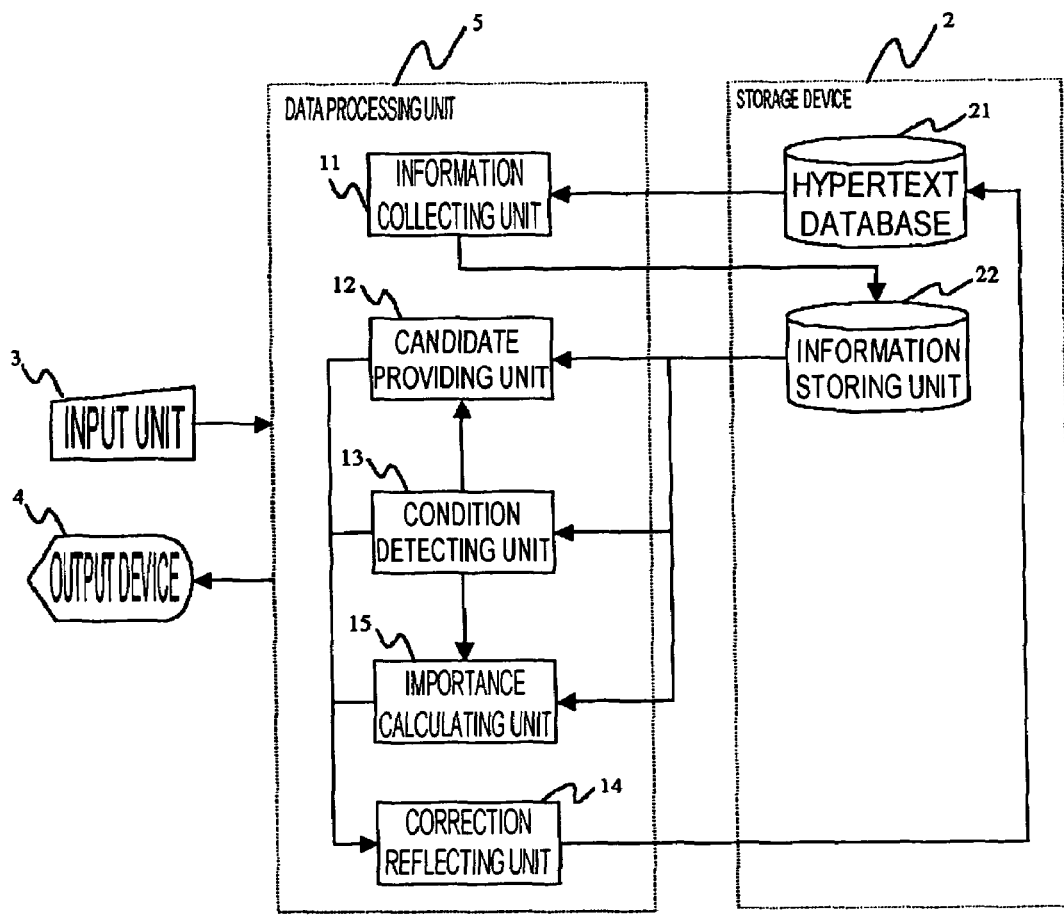
FIG. 24 is a table of an example of the link information extracted in the step of the process of extracting the links varied with time in the link information shown in FIG. 23 in the first embodiment of the hypertext checking apparatus according to the present invention.
FIG. 25 is a block diagram of a second preferred embodiment of the hypertext checking apparatus according to the present invention.

Firstly, referring to T71 in FIG. 23, the condition detecting unit 13 is operated to group the links which are the same in at least one item of the link information at times T and T'. FIG. 24 shows an example of the links grouped into a group of the link target "document 125" in accordance with the link information at times on Aug. 15, 2002, and on Sep. 15, 2002, when the relationship of the documents are as shown in FIG. 4.

In the following step T72 in FIG. 23, the link having many links varied in the link information is extracted from the same group as the mismatched link. In case of FIG. 24, there are four links of the link target "document 125" at a time on Aug. 15, 2002, but there is only one link of the link target "document 125" at a time on Sep. 15, 2002. Therefore, the link 224 is extracted as the mismatched link.

In the following step T72 in FIG. 23, the candidate providing unit 12 provides the correction candidate to compensate the change caused between the times T and T'. Referring to FIG. 23, because the deletion of the links are caused to the rest of the links 221, 222, and 223, between on Aug. 15, 2002 and on Sep. 15, 2002, therefore, the candidate providing unit 12 provides "link: delete" as the correction candidate.

As described above, in this embodiment, the links having the same link target document at times T and T' are respectively grouped as a same group, and when there is a change among some of the links included in the same group between the times T and T', the rest of the link(s) in the group is(are) extracted as the mismatched link. Although it is described in this embodiment that the change is that some of the links are deleted, it is not limited to that example. For example, when there is a change in the link target document for some of the links, the candidate providing unit 12 may provide a correction candidate that indicates the user to correct the hyperlink.

Although it is described in this embodiment that the links having the same link target document at times T and T' are respectively grouped as a same group, the present invention is not limited to this embodiment. In another embodiment, there may be provided a method including the steps of: grouping links having a same hyperlink as a same group; and detecting a change in the style or target attribute.

The effect of this embodiment will be described in the followings.

In this embodiment, all kinds of logical mismatches can be detected. More specifically, in this embodiment, a kind of the detectable logical mismatches may include: (1) putting a link to a wrong destination or target; (2) putting a link to the expired information; (3) inconsistency in the hyperlinks; and (4) inconsistency in the styles of the hyperlinks, as the mismatched link detecting method includes the steps of: extracting the link information from the hypertext database; grouping the links of each item of the link information; and detecting the particular link excluded from the group to consider it as a mismatched link. The logically mismatches, such as (2) the link for the expired information, may be detected by repeating the collection of the link information periodically, and focusing on a change in the link information in accordance with time.

Furthermore, (5) the phantom link for one example of the logically mismatches may be detected by detecting the link having no hyperlink, and (6) the loop link for another example of the logical mismatches may be detected by detecting the links included in a group of links forming a loop and having the hyperlinks corresponding the group of links relevant to a topic.

In this embodiment, the correction candidate of the logically mismatch can be provided for the administrator. More specifically, the candidate correcting method may include a process of automatically calculating the correction candidate so as to harmonize the link information of the particular link excluded from the group with the link information of the rest of the links in the group. Therefore, it is unnecessary for the administrator to consider how to correct the mismatched links, and further it is possible to automatically reflecting the correction.

Furthermore, the grouped mismatched links can be collectively displayed on a display screen in this embodiment. Therefore, all the administrator has to do is to confirm a part of links, thereby making it possible to judge whether the remaining links are mismatched or not. Therefore, the efficiency of check by the administrator can be considerably enhanced.

In this embodiment, there may be provided a display screen displayed thereon a list sorted by each of three items including: (1) a hyperlink; (2) identification information about a source web page; and (3) identification information about a target web page. Therefore, the administrator can grasp the correction item every pages, intensively examine a mismatch to a key page, and examine suitability of the expression which is used for the hyperlink.

In this embodiment, the data processing unit 1 includes the information collecting unit 11, but this information collecting unit 11 may be omitted from the data processing unit 1, as the collection and storage of information about a page and link from the hypertext database 21 which is performed by the information collecting unit 11 in this embodiment, may be performed by another data processing unit, not shown.

Furthermore, the correction reflecting unit 14 in this embodiment may be omitted from the data processing unit 1, when the administrator can correct the mismatched parts in the hypertext database 21 by his hand while viewing a display screen of a list of the results shown in FIG. 13. Even if there are no information about a kind of mismatched link or the correction candidate, the administrator can derive a correction candidate from information, except the kind of mismatched link or the correction candidate, as shown on the display screen in FIG. 13. Therefore, the candidate providing unit 12 in this embodiment may be omitted from the data processing unit 1.

Second Preferred Embodiment

Referring now to FIG. 25 of the drawings, there is shown a second preferred embodiment of the hypertext checking apparatus according to the present invention.

As shown in FIG. 25, the data processing unit 5 includes: the same constitutional elements as those of the data processing unit 1 shown in FIG. 1 in the first embodiment. In addition, the data processing unit 5 of this embodiment includes an importance calculating unit 15.

The importance calculating unit 15 is adapted to calculate an importance value for the mismatched link extracted by the condition detecting unit 13 in accordance with an access frequency to the document in the detected mismatched link, or a seriousness of mismatched link, and to output the calculated importance value with ranks.

The operation of the data processing unit 5 in this embodiment will be described in the followings with reference to the drawings.

Figure 26:
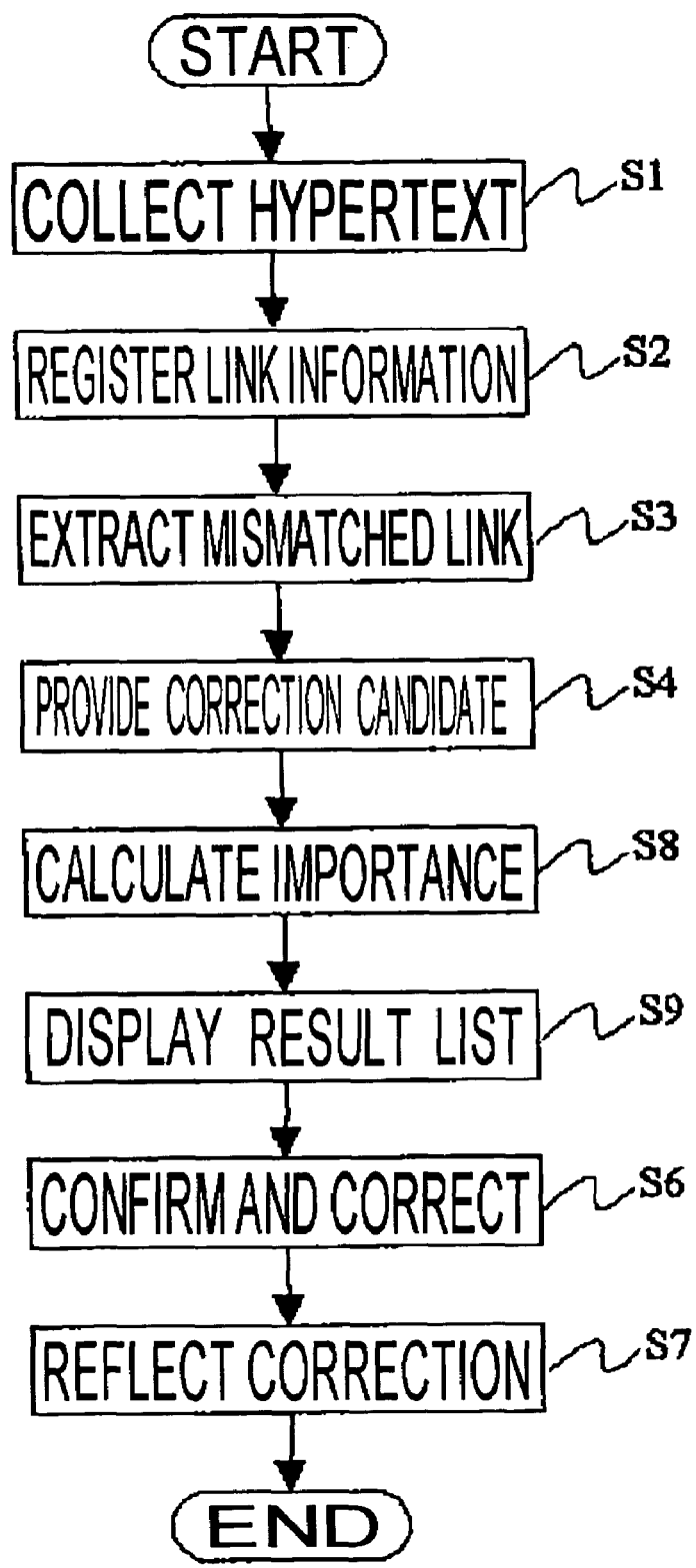
FIG. 26 is a flowchart showing the operations of the second preferred embodiment of the hypertext checking apparatus according to the present invention shown in FIG. 25.

The operations of the information collecting unit 11 and the condition detecting unit 13 of this embodiment, shown in the steps S1 to S3 in FIG. 26, are same as those of the information collecting unit 11 and the condition detecting unit 13 of the first embodiment shown in FIG. 10, thereby the description to these steps is omitted. Then, in the step S4, the candidate providing unit 12 provides a correction candidate so as to eliminate the mismatch in the link extracted by the condition detecting unit 13 as the mismatched link, which is the same as the step S4 of the first embodiment shown in FIG. 10. Then, instead of the step S5 of the first embodiment shown in FIG. 10, control is passed to the importance calculating unit 15 for having the importance calculating unit 15 calculate the importance value for the mismatched link, shown as step S8 in FIG. 26.

The importance calculating unit 15 calculates the importance value of the link extracted as the mismatched link by the condition detecting unit 13, and to output the calculated importance value as a ranking list, shown as the steps S8 and S9 in FIG. 26. In this embodiment, the importance value may be calculated based on at least a factor or a combination of a plurality of factors including: (1) a sort of errors and unsuitability of the detected parts; (2) accuracy of errors and unsuitability of the detected parts; (3) the number of targeted links of the page including the detected parts; (4) record for frequency of access by user to the page including the detected parts; and (5) a stratification level in the hypertext of the page including the detected parts.

Referring to FIG. 27 of the drawings, there is shown a display screen including the ranking list of the outputted mismatched link. The ranking list of the display screen shown in FIG. 27 includes "importance value" in addition to the "kinds of mismatch" and the "correction candidate" and so on which are also included in the list in FIG. 13. More specifically, this importance value of the mismatched link is obtained by grouping the links having the same link targets and the same hyperlinks as a same group, and calculating the importance value of the mismatched links for each of the groups, in addition to the kinds of mismatch and the correction candidate. The importance value of the mismatched link thus obtained is listed in the order where the group having the higher importance value is listed above. The administrator is capable of performing the step S6 in FIG. 26, in which the confirmation and re-writing of the correction candidate is conducted, with referring to the ranking list. As the ranking list includes the importance value which is listed in the order as described above, the administrator is easily conduct the step S6 in FIG. 26.

After that, in the following step S7 in FIG. 26, the correction reflecting unit 14 reflects the correction for each of the documents in the hypertext database 21 in accordance with the confirmed or corrected correction candidate. This step is similarly conducted as the first embodiment.

Although it is described in this embodiment that the importance calculating unit 15 calculates the importance value of the mismatched link and to output the calculated importance value as a ranking list after the candidate providing unit 12 provides the correction candidate, the present invention is not limited to this embodiment. The order of processes is arbitrary changed. For example, in another embodiment, the importance calculating unit 15 may be operated to calculate the importance value of the mismatched link and to output the calculated importance value as a ranking list before the candidate providing unit 12 provides the correction candidate.

Although it is described in this embodiment that the administrator performs the confirmation of the outputted mismatched link and correction candidate, in the step S6 in FIG. 26, the present invention is not limited to this embodiment. In another embodiment, the step 6 may be omitted and the steps S1 through S7 may be automatically performed.

Although it is described in this embodiment that the administrator decides a timing of confirmation, the present invention is not limited to this embodiment. For example, in another embodiment, the collection conditions and the extraction conditions may be previously determined, and the steps S1 to S4, S8, and S9 may be automatically periodically performed. In this case, the results may be informed to the administrator by an electronic mail or the like.

The collection and storage of information about a page and a link from the hypertext database 21 which is performed by the information collecting unit 11 shown in FIG. 25 in this embodiment, may be performed by another data processing unit, which is not shown in the drawings. In such the case, the data processing unit 5 shown in FIG. 25 of this embodiment does not need to include the information collecting unit 11. Furthermore, the administrator can correct the mismatched parts in the hypertext database 21 by his/her hand while viewing a display screen of a list of the results shown in FIG. 27. In such the case, the data processing unit 5 shown in FIG. 25 of this embodiment does not need to include the correction reflecting unit 14.

Furthermore, the administrator can select a correction candidate by himself/herself with the help of information shown in the list of the display screen in FIG. 27 even if the list does not include a kind of mismatched link and the correction candidate. In such the case, the data processing unit 5 shown in FIG. 25 of this embodiment does not need to include the candidate providing unit 12

Third Preferred Embodiment

Figure 28:
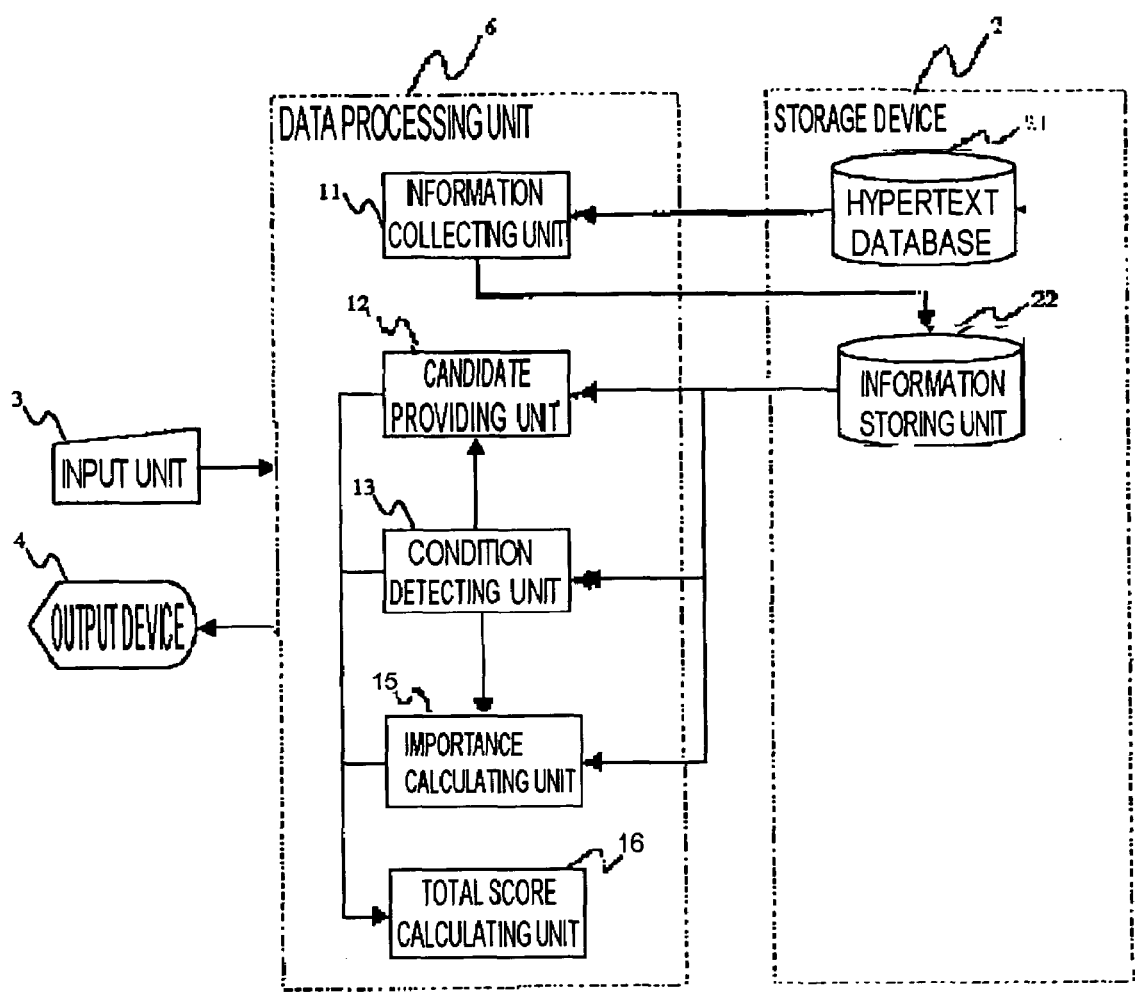
FIG. 28 is a block diagram of a third preferred embodiment of the hypertext checking apparatus according to the present invention.

Referring now to FIG. 28 of the drawings, there is shown a third preferred embodiment of the hypertext checking apparatus according to the present invention.

As shown in FIG. 28, the data processing unit 6 of the third embodiment includes: the same constitutional elements as those of the data processing unit 5 shown in FIG. 25 in the second embodiment. The data processing unit 6 of this embodiment is different from the data processing unit 5 shown in FIG. 25 in including a total score calculating unit 16 instead of the correction reflecting unit 14.

The total score calculating unit 16 is adapted to calculate a total score of the targeted site based on the mismatched link detected by the condition detecting unit 13 and the importance value of the mismatched link calculated by the importance calculating unit 15. In this embodiment, the total score may be calculated based on the number of the mismatched links or a ratio of the number of mismatched links to the total number of links, as well, in addition to using the sum of the value of the mismatched link calculated by the importance calculating unit 15.

The operation of the hypertext checking apparatus according to the present invention will be described in the followings with reference to the drawings.

Figure 29:
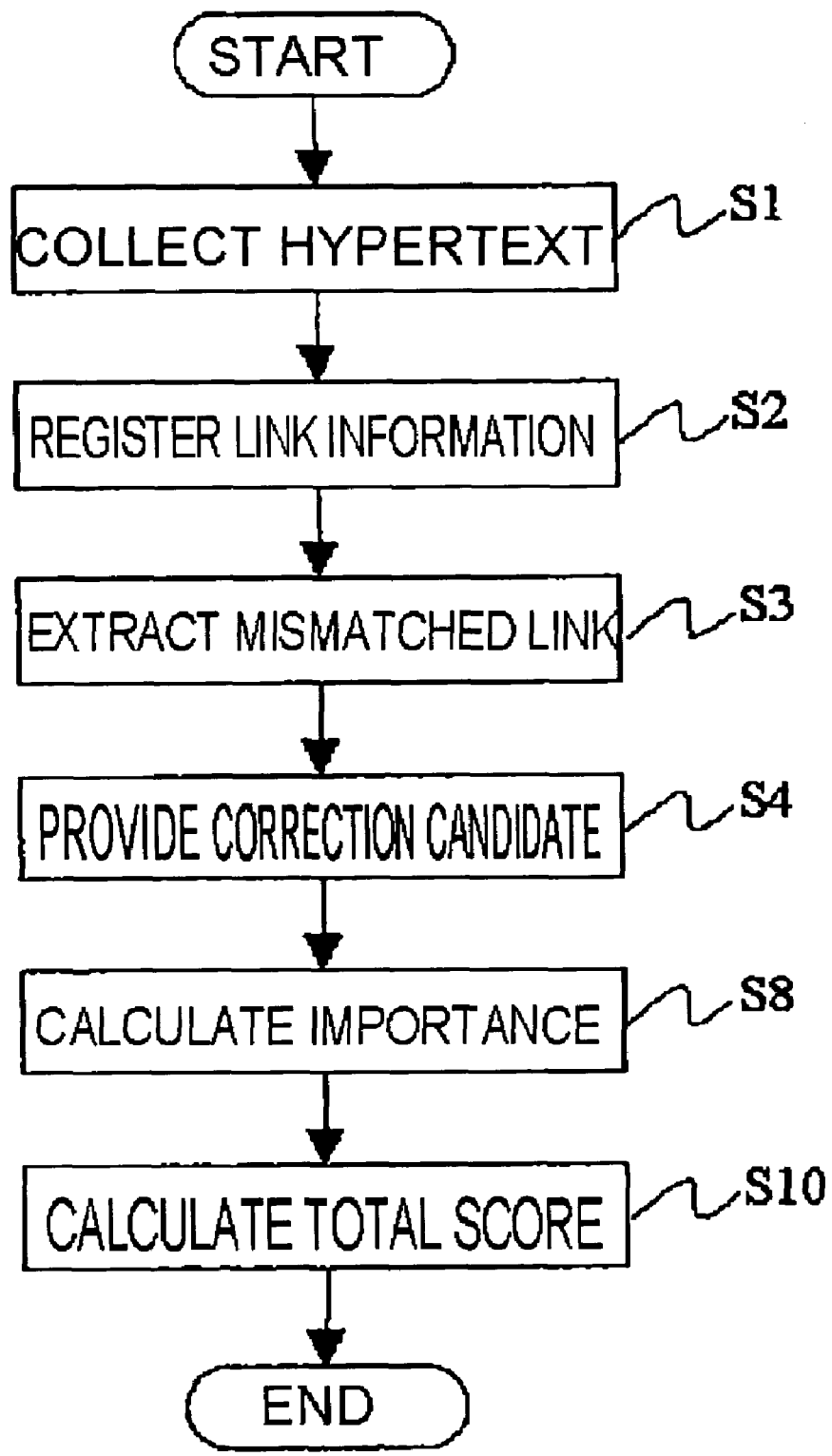
FIG. 29 is a flowchart showing the operations of the third preferred embodiment of the hypertext checking apparatus according to the present invention shown in FIG. 28.

The operations of the information collecting unit 11, the candidate providing unit 12, the condition detecting unit 13, and the importance calculating unit 15 of this embodiment, shown in the steps S1 to S4, and S8 in FIG. 29, are same as those of the second embodiment shown in FIG. 26, thereby the description to these steps is omitted.

In the above second embodiment, the correction is reflected to the hypertext database 21 in accordance with the correction candidate, after detecting the mismatched link. As shown in the step S10 in FIG. 29, the total score calculating unit 16 calculates the total score of the targeted site based on the importance value calculated by the importance calculating unit 15 after the mismatched link is detected in the step S3. Then, the total score calculating unit 16 outputs the calculated total score.

Figure 30:
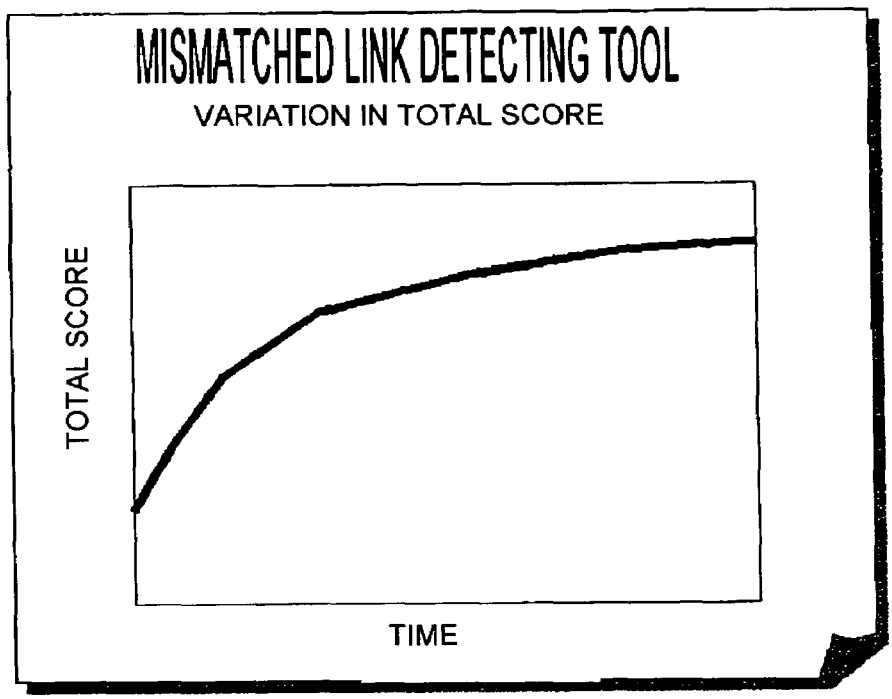
FIG. 30 is a diagram showing an example of a display screen of a line chart of a change with time in a total score in the third preferred embodiment of the hypertext checking apparatus according to the present invention.

The total score calculating unit 16 may periodically perform this calculation. The total score calculating unit 16 may then output the calculated total score. FIG. 30 shows the outputted results of the total score in accordance with times.

With these results, it is possible to see progress of improvement in quality of the targeted site. Referring to FIG. 30, as the time goes on, a rise in total score becomes saturated. It is understood from this result that the process for improving the quality of the targeted site comes to an end.

In this embodiment, the total score calculating unit 16 may calculate the total score at regular intervals, and an alert may be informed when a predetermined condition is fulfilled, such that the total score or the importance value of the parts detected as the mismatched link exceeds a predetermined threshold. With this function, the administrator can receive the alert when the quality of site declines.

Figure 31:
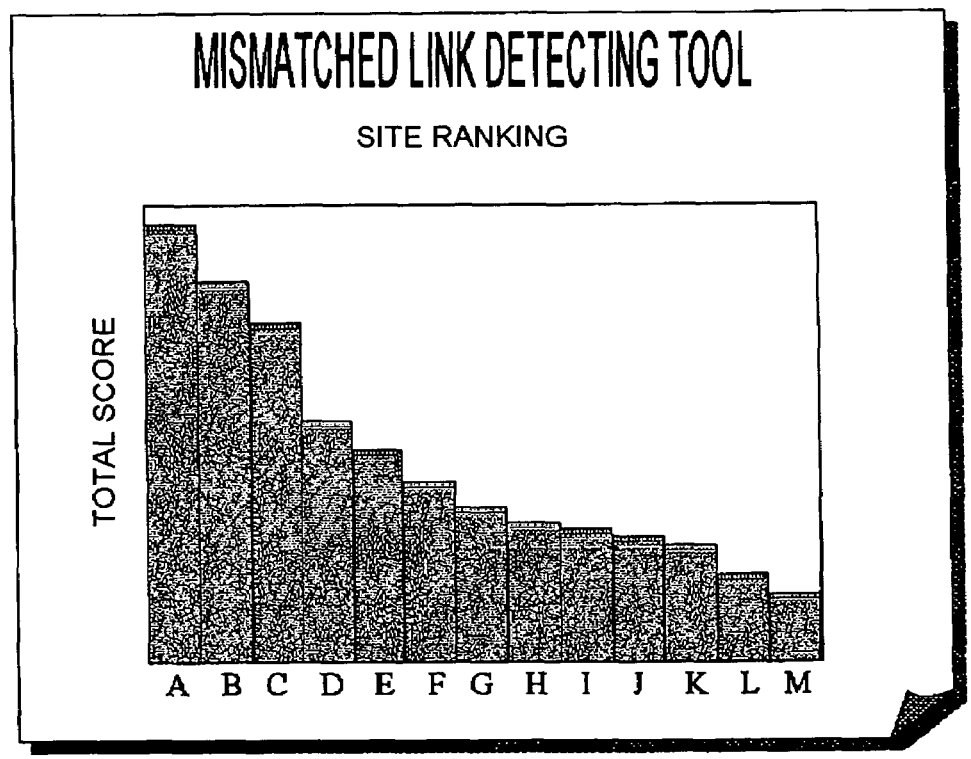
FIG. 31 is a diagram showing an example of a display screen of a bar graph of a site ranking in the total score in the third preferred embodiment of the hypertext checking apparatus according to the present invention.

The total score calculating unit 16 may calculate the total score of each of a plurality of different sites "A" to "M". FIG. 31 shows an example of the results outputted by the total score calculating unit 16. Here, the result is listed in descending order in level. With this result, the administrator is capable of comparing quantitatively qualities of the sites. It is seen from FIG. 31 that the quality of the site "A" is twice as excellent as that of the site "E", for example.

The effect of this embodiment will be described in the followings.

In this embodiment, the total score of the quality of the targeted site is calculated based on the number of the detected mismatched links and the importance value. For this reason, it is possible to grasp progress of improvement in quality of site, and compare quantitatively qualities of the different sites.

Although the data processing unit 6 of this embodiment includes the information collecting unit 11, the information collecting unit 11 may be omitted from the data processing unit 6, because of the fact that the collection and storage of information about a page and link from the hypertext database 21 which is performed by the information collecting unit 11 in this embodiment, may be performed by another data processing unit, not shown.

Although it is not mentioned, the reflection or correction of the detected mismatched parts in the hypertext database 21 may be performed upon request. When the reflection is performed, the administrator may correct the mismatched parts in the hypertext database 21 by his/her hand while viewing a display screen of a list of the results shown in FIG. 27. Alternatively, there may be provided the correction reflecting unit 14 similar to that of the second embodiment.

Even if there are no information about a kind of mismatched link or the correction candidate, the administrator can derive a correction candidate from information, except the kind of mismatched link or the correction candidate, as shown on the display screen in FIG. 27. Therefore, the candidate providing unit 12 in this embodiment may be omitted from the data processing unit 1.

Fourth Preferred Embodiment

The fourth preferred embodiment of the hypertext checking computer program product according to the present invention will be described in the followings with reference to the drawings.

The fourth preferred embodiment of the hypertext checking program product includes a computer usable storage medium, not shown in the drawings, such as a CD-ROM, DVD-ROM, MO, hard disk, EPROM, EEPROM, and so on, or downloaded from a Network server, such as Internet, having computer readable code embodied therein for checking a hypertext.

Figure 32:
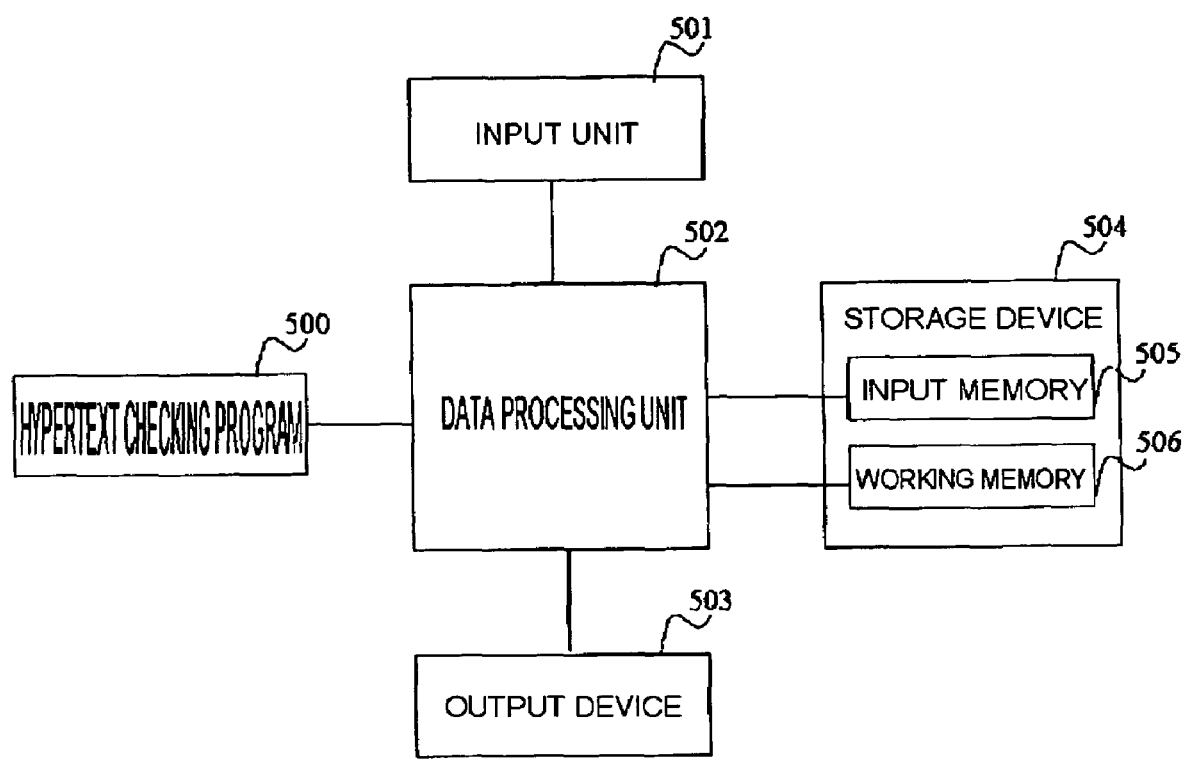
FIG. 32 is a block diagram of a fourth, fifth, and sixth preferred embodiment of a system comprising a hypertext checking program according to the present invention.

Referring now to FIG. 32 of the drawings, there is shown one example of a system including an input unit 501, a data processing unit 502, an output device 503, and a storage device 504 which are similar to the constitutional elements of the apparatus of the first preferred embodiment. This system further includes a hypertext checking program 500 for carrying out a function of the fourth preferred embodiment of the hypertext checking program product according to the present invention which is similar to that of the first embodiment of the hypertext checking apparatus.

The input unit 501 is adapted to allow an operator to input an instruction therethrough. The input unit 501 is such as a mouse, a keyboard, and so on. The output device 503 is adapted to output a processing result from the data processing unit 502. The output device 503 is, for example, a display screen of a displaying unit, a printer, and so forth.

The hypertext checking program 500 is read out from the computer usable storage medium to the data processing unit 502. The hypertext program 500 is then executed by the data processing unit 502 to control the operation of the data processing unit 502, and to create an input memory 505 and a working memory 506 in the storage device 504. The hypertext checking program 500 can therefore establish, as the data processing unit 502, functions of the information collecting unit 11, the candidate providing unit 12, the condition detecting unit 13 and the correction reflecting unit 14 in the first embodiment of the hypertext checking apparatus shown in FIG. 1. The data processing unit 502 thus constructed can perform the steps which are the same as those of the first embodiment by executing the hypertext checking program 500.

The data processing unit 502 and the storage device 504 shown in FIG. 32 correspond to the data processing unit 1 and the storage device 2 shown in FIG. 1, respectively. In this embodiment, the data processing unit 502 may be operated to access an external database by way of a network, such as Internet, in addition to the hypertext database 21 which is stored in the storage device 2 and a target for the check shown in FIG. 1.

Fifth Preferred Embodiment

The fifth preferred embodiment of the hypertext checking computer program product according to the present invention will be described in the followings with reference to the drawings.

The configuration of the fifth embodiment is shown in FIG. 32 which is the same figure of the above fourth embodiment. The fifth preferred embodiment of the hypertext checking program product includes a computer usable storage medium, not shown, having computer readable code embodied therein for checking a hypertext.

The hypertext checking program 500 is read out from the computer usable storage medium to the data processing unit 502. The hypertext program 500 is then executed by the data processing unit 502 to control the operation of the data processing unit 502, and to create an input memory 505 and a working memory (or working area) 506 in the storage device 504. The hypertext checking program 500 can therefore establish, as the data processing unit 502, functions of the information collecting unit 11, the candidate providing unit 12, the condition detecting unit 13, the correction reflecting unit 14 and the importance calculating unit 15 in the second embodiment of the hypertext checking apparatus shown in FIG. 25. The data processing unit 502 thus constructed can perform the steps which are the same as those of the second embodiment by executing the hypertext checking program 500.

The data processing unit 502 and the storage device 504 shown in FIG. 32 correspond to the data processing unit 5 and the storage device 2 shown in FIG. 25, respectively. In this embodiment, the data processing unit 502 may be operated to access an external database by way of a network, such as Internet, in addition to the hypertext database 21 which is stored in the storage device 2 and a target for the check shown in FIG. 1.

Sixth Preferred Embodiment

The sixth preferred embodiment of the hypertext checking computer program product according to the present invention will be described in the followings with reference to the drawings.

The configuration of the sixth embodiment is shown in FIG. 32 which is the same figure of the above fourth embodiment. The sixth preferred embodiment of the hypertext checking program product includes a computer usable storage medium, not shown, having computer readable code embodied therein for checking a hypertext.

The hypertext checking program 500 is read out from the computer usable storage medium to the data processing unit 502. The hypertext program 500 is then executed by the data processing unit 502 to control the operation of the data processing unit 502, and to create an input memory (or input buffer) 505 and a working memory 506 in the storage device 504. The hypertext checking program 500 can therefore establish, as the data processing unit 502, functions of the information collecting unit 11, the candidate providing unit 12, the condition detecting unit 13, the importance calculating unit 15 and the total score calculating unit 16 in the second embodiment of the hypertext checking apparatus shown in FIG. 28. The data processing unit 502 thus constructed can perform the steps which are the same as those of the third embodiment by executing the hypertext checking program 500.

The data processing unit 502 and the storage device 504 shown in FIG. 32 correspond to the data processing unit 6 and the storage device 2 shown in FIG. 28, respectively. In this embodiment, the data processing unit 502 may be operated to access an external database by way of a network, such as Internet, in addition to the hypertext database 21 which is stored in the storage device 2 and a target for the check shown in FIG. 1.

As described above, the following effect can be achieved according to the embodiments of the present invention.

The present invention has a first advantage over the prior art in making it possible to detect various logical mismatches. It is understood from the following description why the present invention has the first advantage. According to the present invention, detectable logical mismatches include: (1) a link to a wrong destination; (2) a link to expired information; (3) inconsistency in the hyperlinks; and (4) inconsistency in the styles of the hyperlinks, as the mismatched link detecting method includes the steps of: extracting the link information from the hypertext database; grouping the links of each item of link information; and detecting a link excluded from the group to be a mismatched link. The logical mismatches, such as (2) the link to expired information, can be detected by repeating the collection of the link information periodically, and focusing on a change in the link information in accordance with time.

Furthermore, (5) the phantom link can be detected by detecting a link having no hyperlink, and (6) the loop link can be detected by detecting the links included in a group of links forming a loop and having the hyperlinks corresponding the group of links relevant to a same topic.

The present invention has a second advantage over the prior art in that the correcting method of the mismatched links can be automatically determined, thereby making it unnecessary for the administrator to consider how to correct the mismatched links. As the candidate correcting method includes a process of automatically calculating the correction so as to harmonize the link information of the particular link with the link information of the other links in the group, the above advantage can be obtained.

The present invention has a third advantage over the prior art in that the checking efficiency by the administrator can be considerably enhanced. As the grouped mismatched links can be collectively displayed on a display screen, the administrator can confirm some links, thereby making it possible to judge whether the remaining links are mismatched or not.

The present invention has a fourth advantage over the prior art in correcting items on every page, examining a mismatch against a key page, and examining the suitability of an expression which is used for the hyperlink. A display screen may be provided displaying thereon a list having three items including: (1) a hyperlink; (2) identification information about a source web page; and (3) identification information about a target web page, the above advantage can be obtained.

The present invention has a fifth advantage over the prior art in improving the quality of site, and quantitatively comparing qualities of the different sites. As the total score of the quality of the targeted site is calculated based on the number of the detected mismatched links and the importance, the above advantage can be obtained.

What is claimed is:

1. An apparatus for checking a link to a target hypertext database, said apparatus comprising:
    a data processing unit; and
    a storage device for storing information related to links,
    wherein the data processing unit executes instructions for calculating scores based on the information related to links stored in said storage device, and detecting a logically mismatched link to said hypertext database based on said calculated scores.

2. The apparatus for checking the link as set forth in claim 1, wherein said data processing unit executes instructions for detecting at least one of the following logically mismatched links:
    a link having a mismatch between the hyperlink appearing on a source web page and a target web page;
    a link having a mismatch between the hyperlink appearing on the source web page and a target web page having expired content;
    a link having an inconsistent hyperlink appearing on multiple web pages;
    a link having a different method of presenting an associated target web page than other links on the same web page or in the same website;
    a link having a hyperlink that is not readily apparent to a user; and
    a link that forms a loop with other links relating to a similar topic.

3. The apparatus for checking a link as set forth in claim 1, wherein said data processing unit executes instructions for checking a link to a target website.

4. An apparatus for checking a link, said apparatus comprising:
    an information storing unit which stores information about links; and
    a condition detecting unit which executes instructions for calculating scores based on the information related to links stored in said information storing unit, and detecting a logically mismatched link based on said calculated scores.

5. The apparatus for checking a link as set forth in claim 4, further comprising an information collecting unit which collects said information about the links stored by said information collecting unit.

6. The apparatus for checking a link as set forth in claim 5, wherein said information collecting unit repeatedly collects said information about the links, and said information storing unit stores said information collected at different times.

7. The apparatus for checking a link as set forth in claim 4, further comprising a candidate providing unit which provides a correction candidate related to the logically mismatched link detected by said condition detecting unit, wherein the correction candidate includes information for correcting the link information of the mismatched link.

8. The apparatus for checking a hypertext as set forth in claim 7, further comprising an importance calculating unit which calculates importance value of said part including the logically mismatched link detected by said condition detecting unit.

9. The apparatus for checking a hypertext as set forth in claim 8, further comprising a total score calculating unit which calculates a total score related to said hypertext based on at least one of factors including: the importance value calculated by said importance calculating unit, the number of said parts detected by said condition detecting unit, and the rate of the number of said part detected by said condition detecting unit corresponding to the total number of the links.

10. The apparatus for checking a hypertext as set forth in claim 8, wherein said importance calculating unit is operated to calculate importance value based on at least one of the following factors including:
    (1) a sort of errors or unsuitability of the detected part detected by said condition detecting unit;
    (2) accuracy of errors or unsuitability of said detected part;
    (3) the number of links which is connected to the page including said detected part;
    (4) a record of frequency of access to the page including said detected part; and
    (5) a stratification level in the hypertext of the page including said detected part.

11. The apparatus for checking a hypertext as set forth in claim 8, wherein said importance calculating unit is operated to calculate the importance value of the detected part detected by said condition detecting unit, and to control output condition for said detected part in accordance with said importance value, said output condition including the number of outputting said detected part or a method of outputting said detected part.

12. The apparatus for checking a link as set forth in claim 7, further comprising a correction reflecting unit which corrects the logically mismatched link.

13. The apparatus for checking a link as set forth in claim 7, wherein said condition detecting unit divides said information about the links into groups including a major group and a minor group in accordance with a predetermined condition and detects said minor group as including the logically mismatched link.

14. The apparatus for checking a link as set forth in claim 7, wherein said condition detecting unit detects a link having a mismatch between the link and a target web page.

15. The apparatus for checking a link as set forth in claim 7, wherein said condition detecting unit detects a link having a mismatch between a hyperlink appearing on a source web page and a target web page having expired content.

16. The apparatus for checking a hypertext as set forth in claim 4, further comprising an importance calculating unit which calculates the importance value of the part including the logically mismatched link detected by said condition detecting unit.

17. The apparatus for checking a hypertext as set forth in claim 16 further comprising a total score calculating unit which calculates a total score related to said hypertext based on at least one of factors including: the importance value calculated by said importance calculating unit, the number of said parts detected by said condition detecting unit, and the rate of the number of said part detected by said condition detecting unit corresponding to the total number of the links.

18. The apparatus for checking a link as set forth in claim 4, wherein said condition detecting unit divides said information about the links into groups in accordance with a predetermined condition and detects a subgroup of the groups that includes the logically mismatched link.

19. The apparatus for checking a link as set forth in claim 4, wherein said condition detecting unit detects a link having a mismatch between the link and a target web page.

20. The apparatus for checking a link as set forth in claim 4, wherein said condition detecting unit detects a link having a mismatch between the hyperlink appearing on a source web page and a target web page having expired content.

21. The apparatus for checking a link as set forth in claim 4, wherein said condition detecting unit detects a link on multiple web pages having an inconsistent hyperlink appearing on the multiple web pages.

22. The apparatus for checking a link as set forth in claim 4, wherein a link to a target website is checked.

23. An apparatus for checking a link, said apparatus comprising:
  an information storing unit which stores information about links; and
  a condition detecting unit which executes instructions for detecting a logically mismatched link,
  wherein said condition detecting unit calculates criteria scores of the links based on at least one of the following scores and detects the link with the highest criteria score as said logically mismatched link, said scores including:
  a first score calculated by comparing the hyperlinks of links having the same target web page;
  a second score calculated by comparing the target web pages of links having identical hyperlinks;
  a third score calculated by comparing the target web pages of a plurality of links having the same source web page and identical hyperlinks; and
  a fourth score calculated by comparing contents of a hyperlink and contents of a target web page.

24. An apparatus for checking a link, said apparatus comprising:
  an information storing unit which stores information about links;
  a condition detecting unit which executes instructions for detecting a logically mismatched link; and
  a candidate providing unit which provides a correction candidate related to the logically mismatched link detected by said condition detecting unit,
  wherein the correction candidate includes information for correcting the link information of the mismatched link,
  wherein said condition detecting unit divides said information about the links into groups including a major group and a minor group in accordance with a predetermined condition and detects said minor group as including the logically mismatched link, and
  wherein said candidate providing unit provides a correction candidate that makes said minor group conform to said major group.

25. An apparatus for checking a link, said apparatus comprising:
  an information storing unit which stores information about links;
  a condition detecting unit which executes instructions for detecting a logically mismatched link; and
  a candidate providing unit which provides a correction candidate related to the logically mismatched link detected by said condition detecting unit,
  wherein the correction candidate includes information for correcting the link information of the mismatched link, and
  wherein said condition detecting unit calculates criteria scores of the links based on at least one of the following scores and detects the link with the highest criteria score as said logically mismatched link, said scores including:
  a first score calculated by comparing
  the hyperlinks of links having the same target web page;
  a second score calculated by comparing the target web pages of links having identical hyperlinks;
  a third score calculated by comparing the target web pages of a plurality of links having a same source web page and identical hyperlinks; and
  a fourth score calculated by comparing contents of a hyperlink and contents of a target web page.

26. The apparatus for checking a link as set forth in claim 25, wherein said candidate providing unit provides at least one of the following correction candidates including:
  a first correction candidate for hyperlinks obtained by comparing the hyperlinks of links having the same target web page;
  a second correction candidate for target web pages obtained by comparing the target web pages of links having identical hyperlinks;
  a third correction candidate for target web pages obtained by comparing the target web pages of links having the same source web page and identical hyperlinks; and
  a fourth correction candidate for hyperlinks obtained by comparing contents of a hyperlink and contents of a target web page.

27. An apparatus for checking a link, said apparatus comprising:
  an information storing unit which stores information about links;
  a condition detecting unit which executes instructions for detecting a logically mismatched link; and
  a candidate providing unit which provides a correction candidate related to the logically mismatched link detected by said condition detecting unit,
  wherein the correction candidate includes information for correcting the link information of the mismatched link, and
  wherein said condition detecting unit detects a link on multiple web pages having an inconsistent hyperlink appearing on the multiple web pages, and
  said candidate providing unit provides a correction candidate for the hyperlink by comparing hyperlinks of links having the same target web page as that of said detected link.

28. An apparatus for checking a link, said apparatus comprising:

an information storing unit which stores information about links;

a condition detecting unit which executes instructions for detecting a logically mismatched link; and an information collecting unit which collects said information about the links stored by said information collecting unit, wherein said information collecting unit repeatedly collects said information about the links, and said information storing unit stores said information collected at different times, and wherein said condition detecting unit detects a link having a mismatch between a hyperlink appearing on a source web page and a target web page by analyzing said information and determining a change in the number of links during said times.

29. An apparatus for checking a link, said apparatus comprising:

an information storing unit which stores information about links;

a condition detecting unit which executes instructions for detecting a logically mismatched link; and an information collecting unit which collects said information about the links stored by said information collecting unit, wherein said information collecting unit extracts character strings corresponding to hyperlinks of said links through character recognition when the hyperlinks are images and registers said extracted character strings as said information about the links in said information storing unit.

30. A method of checking a link in a database comprising:

accepting a condition for detecting a link, said link including a logical mismatch in an associated hyperlink appearing on the source web page;

detecting said link based on said condition;

displaying, on a display screen, a result of the detection as a list with at least three items including:

the associated hyperlink;

identification information about the source web page of said link; and identification information about a target web page of said link.

31. The method of checking a link in a database as set forth in claim 30, wherein said list is sorted by having one of said at least three items as a key.

32. The method of checking a link in a database as set forth in claim 30 further comprising:

accepting a correction candidate for said at least three items; and correcting said link in accordance with said correction candidate.

33. The method of checking a link in a database as set forth in claim 30, further comprising specifying a database.

34. A computer usable storage medium having stored therein a computer program for causing said computer to perform a method of checking a link in a database, said program including computer executable instructions for performing steps comprising:

storing information about links;

calculating scores based on the stored information about links; and detecting a logically mismatched link based on the calculated scores.

35. The computer program product as set forth in claim 34, wherein said computer readable code includes a cord for having said computer serve as an importance calculating unit which calculates the importance value of the part including the logically mismatched link detected by said condition detecting unit.

36. The computer program product as set forth in claim 35, wherein said computer readable code includes a cord for having said computer serve as a total score calculating unit which calculates a total score related to said hypertext based on at least one of factors, said factors including the importance value calculated by said importance calculating unit, the number of said parts detected by said condition detecting unit, and the rate of the number of said part detected by said condition detecting unit corresponding to the total number of the links.

37. The computer usable storage medium having stored therein a computer program as defined in claim 34, wherein said program further includes computer executable instructions for performing steps comprising dividing said information about the links into groups in accordance with a predetermined condition and detecting a subgroup of the groups that includes the logically mismatched link.

38. The computer usable storage medium having stored therein a computer program as defined in claim 34, wherein said program further includes computer executable instructions for performing steps comprising detecting a link having a mismatch between the link and a target web page.

39. The computer usable storage medium having stored therein a computer program as defined in claim 34, wherein said program further includes computer executable instructions for performing steps comprising detecting a link having a mismatch between a hyperlink appearing on a source web page and a target web page having expired content.

40. The computer usable storage medium having stored therein a computer program as defined in claim 34, wherein said program further includes computer executable instructions for performing steps comprising checking a link to a target website.

41. A computer-readable medium having stored therein a computer program for causing said computer to perform a method of checking a link in a database, said program including computer executable instructions for performing steps comprising:

collecting information about links and storing said information in an information storing unit;

calculating scores based on the stored information about links; and detecting a logically mismatched link based on the calculated scores.

42. The computer readable medium having stored therein a program as defined in claim 41, wherein said program further includes computer executable instructions for performing steps comprising providing a correction candidate related to the logically mismatched link.

43. The computer program product as set forth in claim 42, wherein said computer readable code includes a cord for having said computer serve as an importance calculating unit which calculates importance value of said part including the logically mismatched link detected by said condition detecting unit.

44. The computer program product as set forth in claim 43, wherein said computer readable code includes a cord for having said computer serve as a total score calculating unit which calculates a total score related to said hypertext based on at least one of factors, said factors including the importance value calculated by said importance calculating unit, the number of said pails detected by said condition detecting unit, and the rate of the number of said part detected by said condition detecting unit corresponding to the total number of the links.

45. The computer program product as set forth in claim 43, wherein said importance calculating unit is operated to calculate importance value based on at least one of the following factors including:
(1) a sort of errors or unsuitability of the detected part detected by said condition detecting unit;
(2) accuracy of errors or unsuitability of said detected part;
(3) the number of links which is connected to the page including said detected part;
(4) a record of frequency of access to the page including said detected part; and
(5) a stratification level in the hypertext of the page including said detected part.

46. The computer program product as set forth in claim 43, wherein said importance calculating unit is operated to calculate the importance value of the detected part detected by said condition detecting unit, and to control output condition for said detected part in accordance with said importance value, said output condition including the number of outputting said detected part or a method of outputting said detected part.

47. The computer readable medium having stored therein a program as defined in claim 42, wherein said program further includes computer executable instructions for performing steps comprising correcting the logically mismatched link.

48. The computer readable medium having stored therein a program as defined in claim 42, wherein said program further includes computer executable instructions for performing steps comprising dividing said information about the links into groups including a major group and a minor group in accordance with a predetermined condition and detecting said minor group as including the logically mismatched link.

49. The computer readable medium having stored therein a program as defined in claim 42, wherein said program further includes computer executable instructions for performing steps comprising detecting a link having a mismatch between the link and a target web page.

50. The computer readable medium having stored therein a program as defined in claim 42, wherein said program further includes computer executable instructions for performing steps comprising detecting a link having a mismatch between a hyperlink appearing on a source web page and a target web page having expired content.

51. The computer readable medium having stored therein a program as defined in claim 41, wherein said program further includes computer executable instructions for performing steps comprising repeatedly collecting said information about the links, and storing said information collected at different times.

52. The computer readable medium having stored therein a program as defined in claim 41, wherein said program further includes computer executable instructions for performing steps comprising checking a link to a target website.

53. A computer usable storage medium having stored therein a computer program for causing said computer to perform a method of checking a link in a database, said program including computer executable instructions for performing steps comprising:
storing information about links;
detecting a logically mismatched link; and
calculating criteria scores of the links based on at least one of the following scores and detecting the link with the highest criteria score as said logically mismatched link, said scores including:
a first score calculated by comparing link source descriptions of a plurality of the hyperlinks of links having a same target web page;
a second score calculated by comparing the target web pages of a plurality of links having identical hyperlinks;
a third score calculated by comparing the target web pages of a plurality of links having a same source web page and identical hyperlinks; and
a fourth score calculated by comparing contents of a hyperlink and contents of a target web page.

54. A computer usable storage medium having stored therein a computer program for causing said computer to perform a method of checking a link in a database, said program including computer executable instructions for performing steps comprising:
storing information about links;
detecting a logically mismatched link; and
detecting a link on multiple web pages having an inconsistent hyperlink appearing on the multiple web pages.

55. A computer readable medium having stored therein a program for causing said computer to perform a method of checking a link in a database, said program including computer executable instructions for performing steps comprising:
collecting information about links and storing said information in an information storing unit;
detecting a logically mismatched link;
providing a correction candidate related to the logically mismatched link;
dividing said information about the links into groups including a major group and a minor group in accordance with a predetermined condition and detecting said minor group as including the logically mismatched link; and
providing a correction candidate that makes said minor group conform to said major group.

56. A computer readable medium having stored therein a program for causing said computer to perform a method of checking a link in a database, said program including computer executable instructions for performing steps comprising:
collecting information about links and storing said information in an information storing unit;
detecting a logically mismatched link;
providing a correction candidate related to the logically mismatched link; and
calculating criteria scores of the links based on at least one of the following scores and detecting the link with the highest criteria score as said logically mismatched link, said scores including:
a first score calculated by comparing the hyperlinks of links having the same target web page;
a second score calculated by comparing the target web pages of links having identical hyperlinks;
a third score calculated by comparing the target web pages of a plurality of links having a same source web page and identical hyperlinks; and
a fourth score calculated by comparing contents of a hyperlink and contents of a target web page.

57. The computer readable medium having stored therein a program as defined in claim 56, wherein said program further includes computer executable instructions for performing steps comprising providing at least one of the following correction candidates, said correction candidates including:
a first correction candidate for hyperlinks obtained by comparing the hyperlinks of links having the same target web page;

a second correction candidate for target web pages obtained by comparing the target web pages of links having identical hyperlinks;

a third correction candidate for target web pages obtained by comparing the target web pages of links having the same source web page and identical hyperlinks; and a fourth correction candidate for hyperlinks obtained by comparing contents of a hyperlink and contents of a target web page.

58. A computer readable medium having stored therein a program for causing said computer to perform a method of checking a link in a database, said program including computer executable instructions for performing steps comprising:

collecting information about links and storing said information in an information storing unit;

detecting a logically mismatched link;

providing a correction candidate related to the logically mismatched link;

detecting a link on multiple web pages having an inconsistent hyperlink appearing on the multiple web pages; and providing a correction candidate for the hyperlink by comparing hyperlinks of links having the same target web page as that of said detected link.

59. A computer readable medium having stored therein a program for causing said computer to perform a method of checking a link in a database, said program including computer executable instructions for performing steps comprising:

collecting information about links and storing said information in an information storing unit;

detecting a logically mismatched link;

repeatedly collecting said information about the links, and storing said information collected at different times; and detecting a link having a mismatch between a hyperlink appearing on a source web page and a target web page by analyzing said information and determining a change in the number of links during said times.

60. A computer readable medium having stored therein a program for causing said computer to perform a method of checking a link in a database, said program including computer executable instructions for performing steps comprising:

collecting information about links and storing said information in an information storing unit;

detecting a logically mismatched link; and extracting character strings corresponding to hyperlinks of said links through character recognition when the hyperlinks are images and registering said extracted character strings as said information about the links in said information storing unit.

* * * * *